(12) United States Patent
Vachula et al.

(10) Patent No.: US 12,295,352 B2
(45) Date of Patent: May 13, 2025

(54) FEEDING SYSTEM

(71) Applicants: Faunalogy Inc., Ronkonkoma, NY (US); Le Vachula, Ronkonkoma, NY (US); Ronald George Vachula, Jr., Ronkonkoma, NY (US)

(72) Inventors: Le Vachula, Ronkonkoma, NY (US); David Michael Cowan, Brooklyn, NY (US); Joshua Lars Peterson, Brooklyn, NY (US); Ronald George Vachula, Jr., Ronkonkoma, NY (US)

(73) Assignees: Le Vachula, Ronkonkoma, NY (US); Ronald Vachula, Ronkonkoma, NY (US); Faunalogy Inc., Ronkonkoma, NY (US)

( * ) Notice: Subject to any disclaimer, the term of this patent is extended or adjusted under 35 U.S.C. 154(b) by 517 days.

(21) Appl. No.: 16/787,567

(22) Filed: Feb. 11, 2020

(65) Prior Publication Data

US 2020/0253162 A1   Aug. 13, 2020

Related U.S. Application Data

(60) Provisional application No. 62/804,366, filed on Feb. 12, 2019.

(51) Int. Cl.
*A01K 5/02*   (2006.01)
*A23L 3/28*   (2006.01)

(52) U.S. Cl.
CPC .............. *A01K 5/0291* (2013.01); *A01K 5/02* (2013.01); *A23L 3/28* (2013.01)

(58) Field of Classification Search
CPC ................................ A01K 5/02; A01K 5/0291
See application file for complete search history.

(56) References Cited

U.S. PATENT DOCUMENTS

| 4,044,722 A | 8/1977 | Bradshaw |
| 4,077,360 A | 3/1978 | Figlia |
| 4,421,059 A | 12/1983 | Cousino |
| 5,649,499 A | 7/1997 | Krietzman et al. |

(Continued)

FOREIGN PATENT DOCUMENTS

| CN | 2406481 Y | 11/2000 |
| CN | 201008298 Y | 1/2008 |

(Continued)

OTHER PUBLICATIONS

British Examination Report dated May 12, 2022 received in British Application No. GB2110613.3.

(Continued)

*Primary Examiner* — Monica L Perry
*Assistant Examiner* — Alanna K Peterson
(74) *Attorney, Agent, or Firm* — Scully, Scott, Murphy & Presser, P.C.

(57) ABSTRACT

The disclosure is directed to a feeding system. The feeding system includes a housing that substantially forms an exterior surface of the feeding system, inside the housing includes an arm configured to rotate clockwise and counterclockwise to a plurality of positions, wherein the arm is configured to support a can; a can opener at a first position of the plurality of positions; and an opening of the housing at a second position of the plurality of positions.

34 Claims, 22 Drawing Sheets

(56) References Cited

U.S. PATENT DOCUMENTS

| | | | |
|---|---|---|---|
| 10,568,301 B2* | 2/2020 | Chen | A01K 5/0291 |
| 2002/0108952 A1 | 8/2002 | Delman et al. | |
| 2005/0066905 A1* | 3/2005 | Morosin | A01K 5/0291 |
| | | | 119/51.02 |
| 2005/0094484 A1 | 5/2005 | Sextro | |
| 2005/0218141 A1 | 10/2005 | Kratzer et al. | |
| 2009/0236354 A1 | 9/2009 | Alvares et al. | |
| 2012/0060761 A1 | 3/2012 | Laro | |
| 2013/0247829 A1* | 9/2013 | Taneja | A01K 5/0291 |
| | | | 119/51.11 |
| 2015/0053138 A1 | 2/2015 | Ramsey et al. | |
| 2015/0313176 A1 | 11/2015 | Gelinas | |
| 2016/0037748 A1* | 2/2016 | Taneja | A01K 5/0114 |
| | | | 119/51.01 |
| 2017/0202178 A1 | 7/2017 | Gordon et al. | |
| 2020/0150696 A1* | 5/2020 | Womble | G05D 1/0011 |

FOREIGN PATENT DOCUMENTS

| | | | | |
|---|---|---|---|---|
| CN | 201226717 Y | | 4/2009 | |
| CN | 105682454 A | * | 6/2016 | A01K 11/006 |
| CN | 106234242 A | | 12/2016 | |
| CN | 106659139 A | | 5/2017 | |
| CN | 107320745 A | | 11/2017 | |
| CN | 107373729 A | | 11/2017 | |
| CN | 107396843 A | | 11/2017 | |
| CN | 107920691 A | | 4/2018 | |
| CN | 207505485 U | | 6/2018 | |
| CN | 108308049 A | | 7/2018 | |
| CN | 207767223 U | | 8/2018 | |
| DE | 29617137 U1 | | 12/1996 | |
| FR | 2701353 A1 | | 8/1994 | |
| GB | 2199477 A | | 7/1988 | |
| JP | H03027951 U | | 3/1991 | |
| JP | 3054576 U | | 12/1998 | |
| JP | 2017528119 A | | 9/2017 | |
| WO | 2011076378 A2 | | 6/2011 | |
| WO | 2014/013319 A1 | | 1/2014 | |
| WO | 2020/169726 A1 | | 8/2020 | |

OTHER PUBLICATIONS

International Search Report and Written Opinion dated Apr. 23, 2020 received in International Application No. PCT/US2020/017643.

English-language translation of Office Action received from the Indian Patent Office dated Feb. 16, 2023 received in a corresponding foreign application, 7 pages.

English-language translation of Office Action received from the Chinese Patent Office dated Jan. 19, 2023 received in a corresponding foreign application, 13 pages.

Chinese Office Action and Search Report dated Jun. 23, 2022 received in Chinese Application No. 202080013913.0, together with an English-language translation.

European Search Report dated Sep. 28, 2022 received in a corresponding foreign application, 8 pages.

Notice of Reasons for Refusal dated Oct. 31, 2023 received in Japanese Patent Application No. JP 2021-538139.

Office Action dated Jun. 6, 2023 received in European Patent Application No. EP 20 756 120.0.

Third Office Action dated Jun. 7, 2023 received in Chinese Patent Application No. CN 202080013913.0.

Offical Action dated Jan. 24, 2024 received in European Patent Application No. EP 20756120.0.

Yingfu, L., "Modern Household Essentials", Liaoning People's Publishing House, May 1991, pp. 899-900.

Office Action received in Chinese Patent Application No. 202080013913.0 dated Feb. 21, 2024, 23 pages.

Decision on Rejection dated May 27, 2024 received in Chinese Patent Application No. 202080013913.0, 26 pages.

* cited by examiner

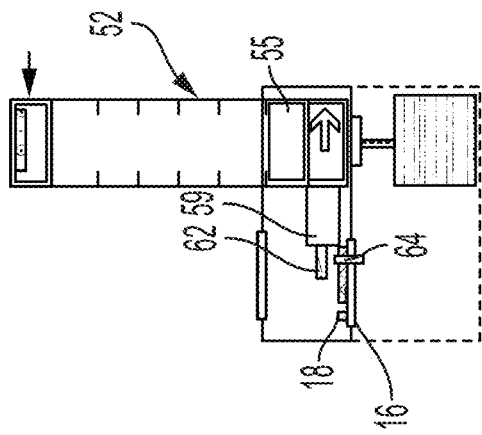
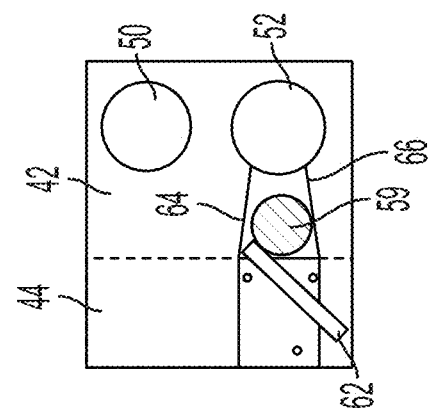
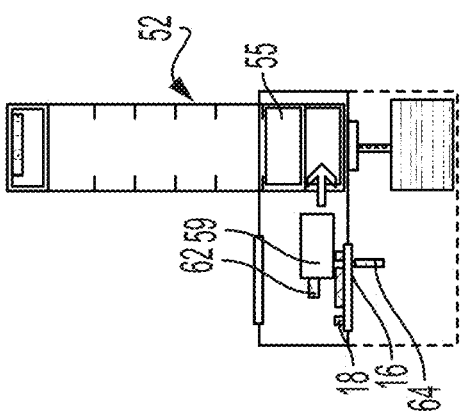
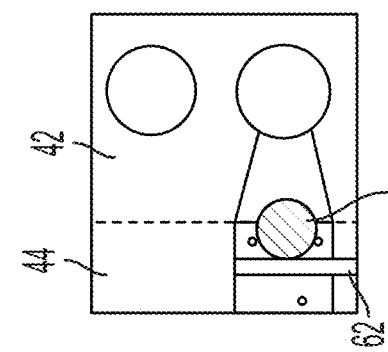
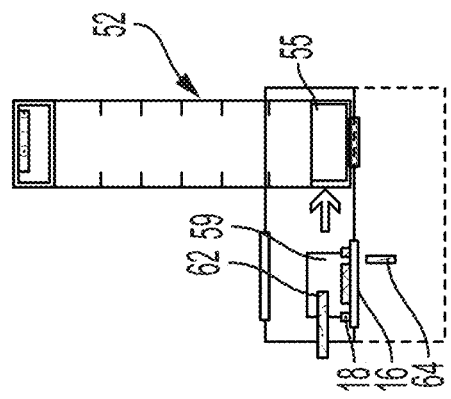
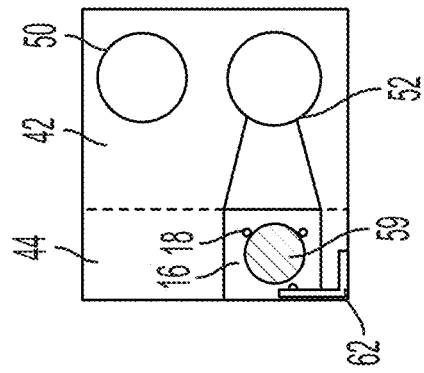
FIG. 3A    FIG. 3B    FIG. 3C

FEEDING SYSTEM

This application claims the benefit of U.S. Provisional Application No. 62/804,366 filed on Feb. 12, 2019, the entire contents of which is incorporated herein by reference.

BACKGROUND OF THE DISCLOSURE

Typical feeding systems succumb to various downfalls, including the ability to only dispense a dry food, or only to allow for exposure of a single receptacle of a wet food. Many feeding systems are not capable of opening one, or more sealed cans of food, including wet food, over time, so that an animal can access the recently opened can of food for feeding. Nor are they capable of containing the opened food in a specialized location made to minimize dry out and bacterial growth.

What is desired is a system and method for feeding various animals, over time, several sealed cans of food. Embodiments of the present disclosure provide methods that address the above and other issues.

SUMMARY OF THE DISCLOSURE

The present disclosure is directed to feeding system that is configured to dispense canned foods.

The present disclosure is also directed to a feeding system. The feeding system includes a housing that substantially forms an exterior surface of the feeding system, inside the housing includes an arm configured to rotate clockwise and counterclockwise to a plurality of positions, wherein the arm is configured to support a can; a can opener at a first position of the plurality of positions; and an opening of the housing at a second position of the plurality of positions.

BRIEF DESCRIPTION OF THE DRAWINGS

The present disclosure will be better understood by reference to the following drawings of which:

A short description of all figures will be added here.

FIGS. 3A-3D are side and top views of an embodiment of the feeding system during operation.

DETAILED DESCRIPTION OF THE DISCLOSURE

Figure 1A:
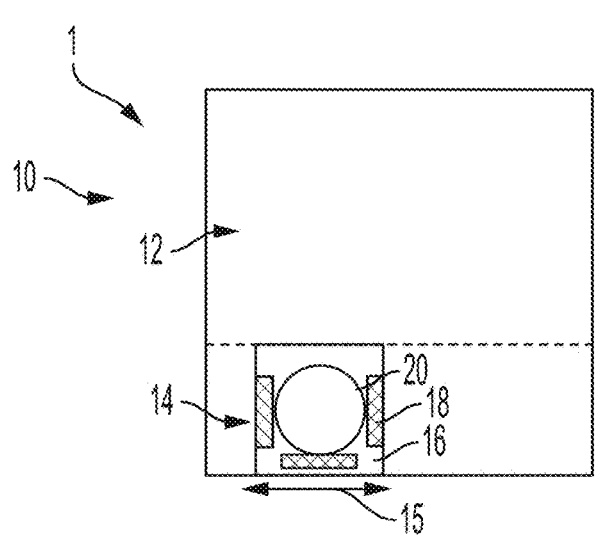
FIGS. 1A-1C are top and front views of an embodiment of the feeding system.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present.

In the discussion and claims herein, the term "about" indicates that the value listed may be somewhat altered, as long as the alteration does not result in nonconformance of the process or structure to the illustrated embodiment. For example, for some elements the term "about" can refer to a variation of ±0.1%, for other elements, the term "about" can refer to a variation of ±1% or ±10%, or any point therein.

As used herein, the term "substantially", or "substantial", is equally applicable when used in a negative connotation to refer to the complete or near complete lack of an action, characteristic, property, state, structure, item, or result. For example, a surface that is "substantially" flat would either be completely flat, or so nearly flat that the effect would be the same as if it were completely flat.

As used herein terms such as "a", "an" and "the" are not intended to refer to only a singular entity, but include the general class of which a specific example may be used for illustration.

As used herein, terms defined in the singular are intended to include those terms defined in the plural and vice versa.

Reference herein to any numerical range expressly includes each numerical value (including fractional numbers and whole numbers) encompassed by that range. To illustrate, reference herein to a range of "at least 50" or "at least about 50" includes whole numbers of 50, 51, 52, 53, 54, 55, 56, 57, 58, 59, 60, etc., and fractional numbers 50.1, 50.2 50.3, 50.4, 50.5, 50.6, 50.7, 50.8, 50.9, etc. In a further illustration, reference herein to a range of "less than 50" or "less than about 50" includes whole numbers 49, 48, 47, 46, 45, 44, 43, 42, 41, 40, etc., and fractional numbers 49.9, 49.8, 49.7, 49.6, 49.5, 49.4, 49.3, 49.2, 49.1, 49.0, etc. In yet another illustration, reference herein to a range of from "5 to 10" includes whole numbers of 5, 6, 7, 8, 9, and 10, and fractional numbers 5.1, 5.2, 5.3, 5.4, 5.5, 5.6, 5.7, 5.8, 5.9, etc.

As used herein, the term "canned foods" or "can" refers to any metal or metal containing container (as well as plastic containers having a film covering) that contains an edible product and/or a pharmaceutical product. FIG. 1A is a top view of a lower tray 10 of an embodiment of a feeding system 1, with elements vertically above the lower tray removed for explanatory purposes. A rear portion 12 of the lower tray is configured to contain various electrical elements (such as wiring, fuses, electrical receiving elements, transformers, etc.), various computing elements (such as a processor, memory, wireless transmitters, etc.), one or more motors and optionally one or more batteries.

The front portion 14 includes a panel 16 that is configured to slide in the direction of arrow 15. The panel 16 can slide by being urged by a pole or other element that can contact the panel 16 and cause it to move. One example of this set up is panel 16 contacts two poles, one causing panel 16 to slide in one direction along arrow 15, the other causing panel 16 to slide in a second, opposite direction along arrow 15. Alternatively, a screw element can rotate and cause panel 16 to slide in each direction of arrow 15.

Operably connected to the panel is a plurality of bumpers 18. In this embodiment, three bumpers are shown, in other embodiments, two, four or more bumpers may be included. These plurality of bumpers 18 are configured to move to and from a center of the panel and are configured to contact an exterior surface of a can 20. The plurality of bumpers 18 can vary in size and shape, and can move to accommodate varying sizes of cans.

In one embodiment, the plurality of bumpers 18 are rolling cylinders that extend vertically from the panel 16 and have a central pushing element connected to a gear (not shown) under the panel 16. As the gear rotates, the central pushing element of each of the plurality of bumpers 18 move either closer together, or further apart depending on which direction the gear rotates. Each of plurality of bumpers 18 can include a sensor (not shown) that is configured to sense a pressure between each of the plurality of bumpers 18 and the can 20. Based on the known location of each of the plurality of bumpers 18 and the pressure measured by the sensors, the feeding system 1 can determine the size of the can on the panel 16.

Figure 1B:
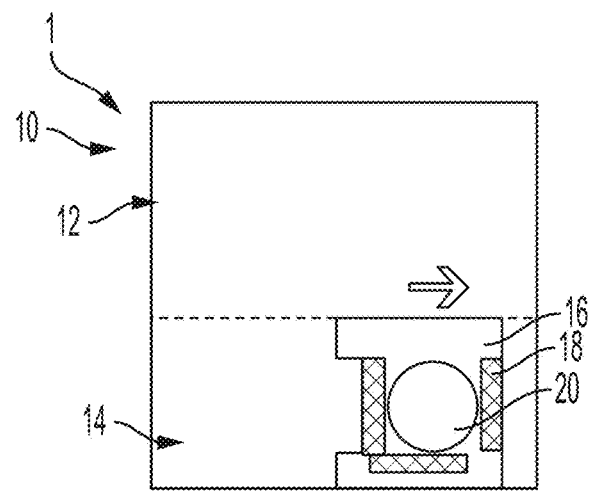

As shown in FIG. 1A, the panel 16 is in a first position, but in FIG. 1B, the panel 16 is in a second position. This second position allows access to the can 20 from outside the feeding system by, for example, a dog or cat. A cover (not shown) is typically vertically above the second position, but upon movement of the panel 16 from the first position to the second position, the cover opens. Alternatively, the panel 16 may be extended to the external part of the system so that it protrudes from the outer enclosure to present the contents of the can.

The cover can open in any suitable way, such as by receiving a signal from a processor, an app, a proximity sensor, a cloud based program, a facial recognition program or a schedule, to open or close at a specific time of day. In other embodiments the cover can be opened manually by a user, or a portion of the cover can be contacted, triggering the cover to move.

Figure 1C:
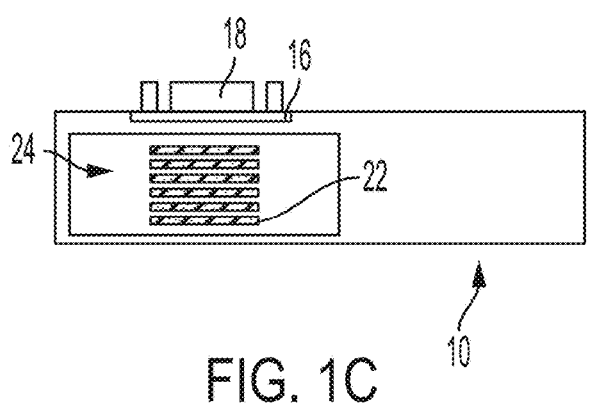

FIG. 1C is a side view of the bottom tray 10. In this view the panel 16 and the plurality of bumpers 18 (without a can) can be seen. Vertically below the panel 16, while the panel 16 is in the first position, is a lid receptacle 24, configured to accept a plurality of lids 22. Once a lid 22 is removed from the can, while the can is in the first position, as further described below, the lid 22 is held in position until after the panel 16 moves to the second position (as shown in FIG. 1B). The lid 22 then is released and falls vertically down into the lid receptacle.

Figure 2A:
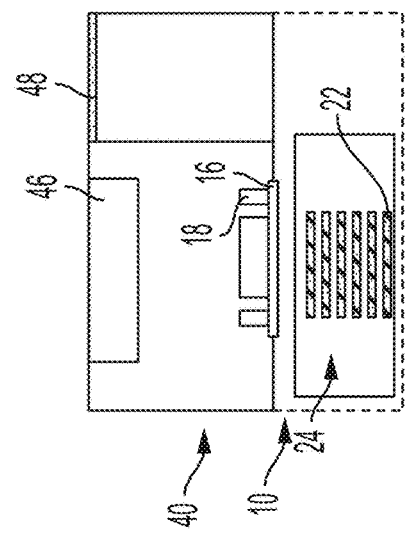
FIGS. 2A-2I are top, left side, right side and front views of an embodiment of the feeding system during operation.

A middle tray 40 is shown in FIG. 2A, which is another view of an embodiment and includes a cover 48 as mentioned above, in a front portion 44. The front portion 44 also includes a can opener 46, which is further discussed below. A rear portion 42 includes a full can receptacle 50 and an open can receptacle 52. The middle tray 40, and its operation, are more fully discussed below.

Figure 2B:
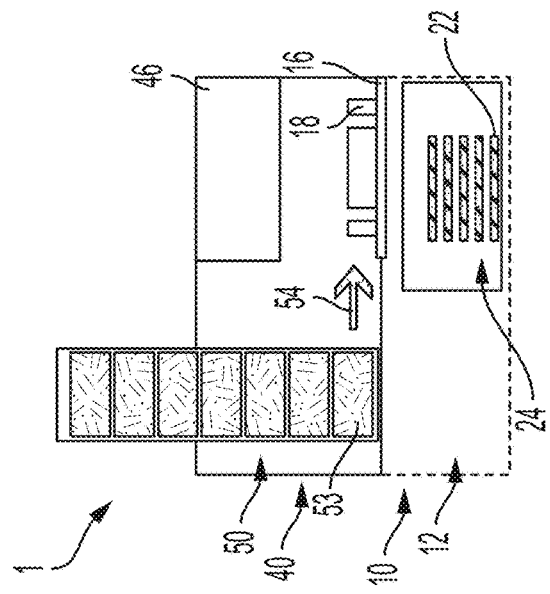

A front side view of the bottom tray 10 and the middle tray 40 is shown in FIG. 2B. As can be seen a can opener 46 is located vertically above the panel 16 (panel 16's first position) and is located to interact with and remove a lid of a can (not shown).

Figure 2C:
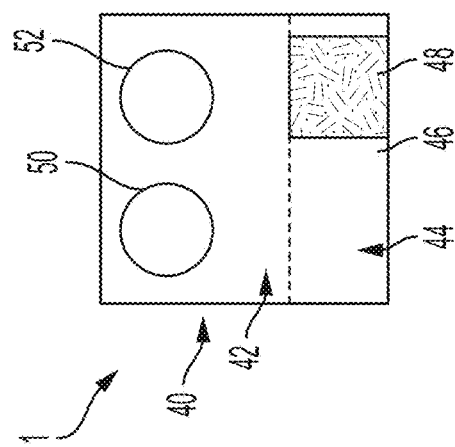

Once a lid has been removed by the can opener 46, the can opener 46 is configured to hold the lid for a period of time, for at least the time panel moves from the first position (FIG. 2B) to the second position (FIG. 2C). The lid can be held in position, against the can opener in any suitable way, such as through application of suction and/or magnetism or any other suitable mechanical means, such as by puncturing, a gripping arm, clamps, etc. Once the panel 16 is located at the second position in FIG. 2C, the lid is released from can opener 46 and falls vertically down towards the lid receptacle 24.

Figure 2D:
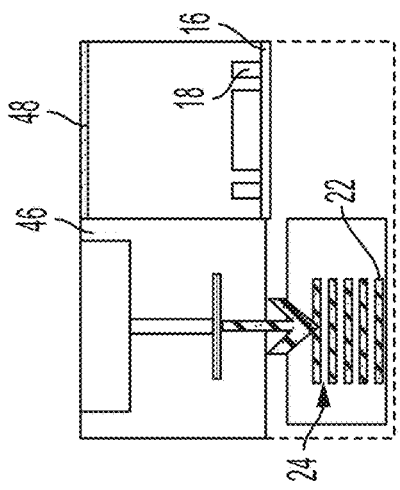

FIG. 2D is a left side view of the feeding system 1. As can be seen, the full can receptacle 50 includes one or more full cans 53 (in this embodiment, for example, 7 cans). In this application, a "full can" refers to any suitable can, of any suitable size, that has a lid that can be removed with a can opener.

Optionally, the sides of the can receptacle 50 may contain moving bumpers under tension that assist with the refill of the cans by slowing the fall of the cans down the receptacle. In addition, these bumpers may be used to sense the size of the can and communicate such information to a processor of the feeding system 1. Alternatively, the full can receptacle 50 and the open can receptacle 52 may be opened sideways to allow manual stacking and removal of cans, instead of having cans slide in and out from the top and/or bottom.

In FIG. 2D, the full can 53 is moved from the full can receptacle 50 onto the panel 16 by a motor (now shown) pushing (or pulling) the full can 53 in the direction of arrow 54. The bumpers 18 then move to contact the can, the can opener 46 then removes the lid, the panel 16 moves to the second position, and the lid is released from the can opener 46 into the lid receptacle 24.

Figure 2E:
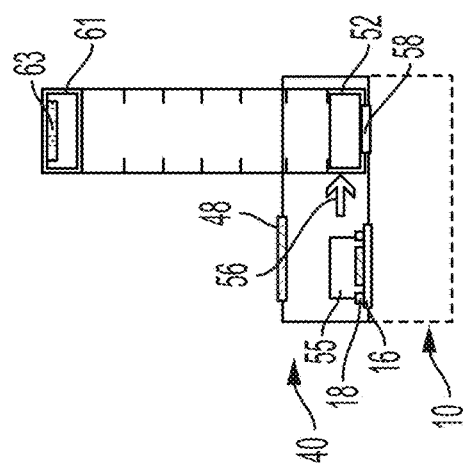

The panel in the second position is shown in FIG. 2E, which is a right side view of the feeding system 1. In this position, the lid 48 can move, allowing access to an opened can 55 from outside the feeding system 1. In this application, an "opened can" refers to any previously "full can", which has had a lid removed, regardless of the volume of contents within the opened can.

In FIG. 2E, at the very top of the open can receptacle 52 is a handle 61. The handle 61 can be fixed, or it may fold down.

On the inside (or on top or around the proximity of the handle) of the handle 61 is a button 63, which may be activated by a user's hand. The button 63 is operatively connected to a plurality of one way valves 60, further described below. When the button 63 is pressed, each of the one way valves 60 will pivot upward, downward, sideways or retract in any way to allow the cans to exit the open can receptacle 52.

Further, the open can receptacle 52 is connected to the feeding system 1 by a thread and screw interaction between the bottom of the open can receptacle 52 and the feeding system 1. The open can receptacle 52 can be removed from the feeding system 1 by grasping the handle 61 and twisting it in a counter-clockwise direction as compared to the feeding system 1. Alternatively, the open can receptacle 52 can be connected to the feeding system 1 by a locking mechanism that can be released when one or more buttons and or levers are pulls or pushed.

Figure 2G:
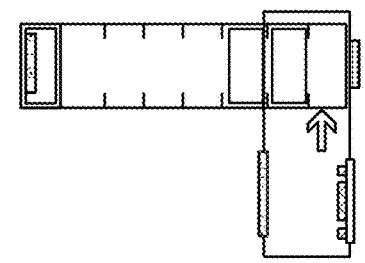
Figure 2F:
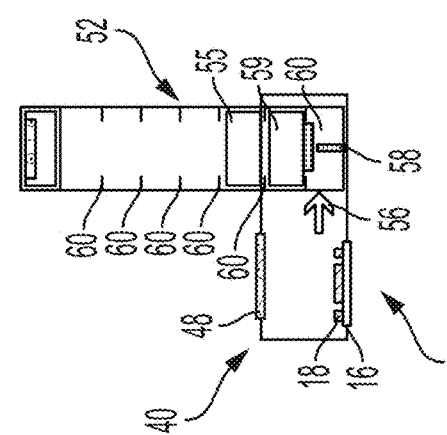

After a period of time (or by a time range programmed into the feeding system 1 or by a manual control through an application connected through the internet to the feeding system 1 or by a physical button on the feeding system 1), the lid 48 is closed, and the opened can 55 is moved in the direction of arrow 56, into the open can receptacle 52. Once in open can receptacle 52, the opened can 55 is moved vertically upwards by a piston 58, which extends (as shown in FIG. 2F) and contacts a bottom surface of the opened can 55, causing the opened can 55 to move past one of the one way valves 60. The piston 58 then retracts, while the opened can 55 is maintained vertically above the one way valve 60, as shown in FIG. 2G Each of the one way valves 60 can be configured to be at any suitable location within the open can receptacle 52 and can be formed of any suitable material. Also, the number of one way valves 60 shown in the figures is for illustrative purposes only, the feeding system 1 can include more or less of these one way valves 60.

Figure 2I:
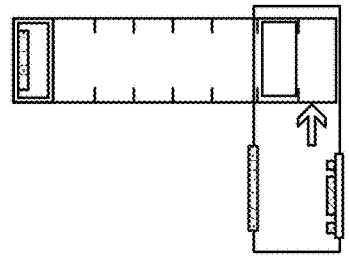
Figure 2H:
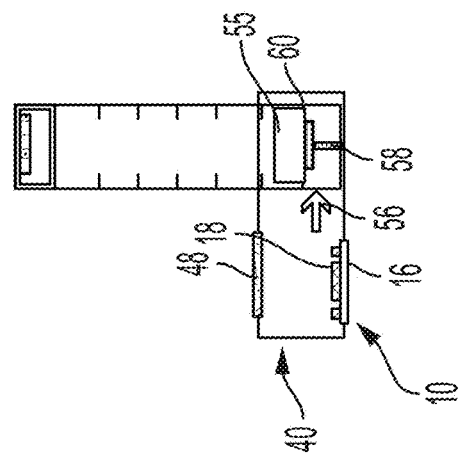

Once another opened can 59 is ready to enter the open can receptacle 52, the next opened can 59 is moved in the direction of arrow 56, the piston 58 extends, the next opened can 59 is moved vertically upwards and contacts both the bottom surface of the first opened can 55, and the one way valve 60, causing the first opened can 55 to move upwards and be maintained by the next one way valve 60 (or by the next opened can 59) and the next opened can 59 to be maintained above the first one way valve 60. The piston 58 then retracts, so that the first opened can 55 and the next opened can 59 are both maintained within the open can receptacle 52, as seen in FIG. 2I. This process can be repeated for each volume of space the open can receptacle 52 can accommodate.

FIGS. 3A-3D provide a more detailed view of the movement of the next opened can 59 of the embodiment. In each of FIG. 3A-3D, the upper panel is the right side view of the feeding system 1, while the bottom panel is a top view of the middle tray 40 of the feeding system 1.

In FIG. 3A an opened can 55 is already within the open can receptacle 52. After a period of time, the next open can 59 is to be moved to the open can receptacle 52. To effect this movement an arm 62 is rotated clockwise from a side of the middle tray 40. This arm 62 can be any suitable size and shape, and can include no, one, or more joints. As can be seen from the top panel of FIG. 3A, the arm 62 is configured to pass vertically over the bumpers 18, but still contact the next open can 59. In another embodiment, a hooked element (not shown) can be driven to hook around the opened can 55 and pull the opened can 55 into the open can receptacle 52. The hooked element can be placed either above or below the can 55.

FIG. 3B illustrates the arm 62 at about half way through its travel distance, as it continued to rotate in the clockwise direction, with the next open can 59 moved from its original location on the panel 16, towards the open can receptacle 52.

FIG. 3C illustrates the arm 62 at the end of its travel distance, which causes the next open can 59 to move beyond the bumpers 18, towards the open can receptacle 52. At this point, a tab 64 extends vertically upwards towards the next open can 59. The arm 62 can then be rotated counter-clockwise back to the position seen in FIG. 3A. Referring again to FIG. 3C, the tab 64 contacts a side surface of the next open can 59, and then the tab 64 moves towards the open can receptacle 52.

Figure 3D:
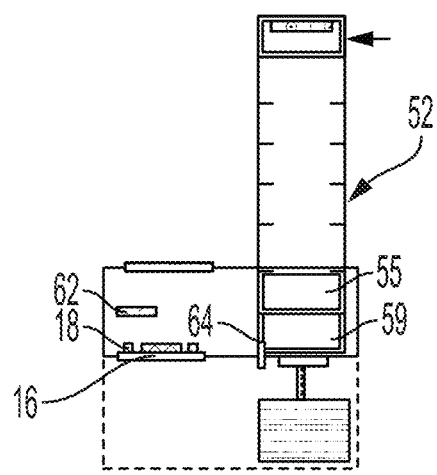

In FIG. 3D, the tab 64 has extended its travel distance and has caused the next open can 59 to enter the open can receptacle 52, with assistance by one or more optional guides 66. The tab can then return to the position seen in FIG. 3A.

Although not shown in the figures, the feeding system 1 can include several other elements, which can be incorporated in or near the feeding system 1 in any suitable way. Some examples of these additional elements include a display screen and manual and/or touch screen buttons for control of various elements of the feeding system 1. In other embodiments, the feeding system 1 can include a camera and internet connection (wired or wireless) so that a user can access the camera from a remote location and view images or video of the feeding system 1 and its environment, including animals. This camera can be activated through an application or program, and can capture images and/or video at specified times or in response to a trigger (such as sensing of motion). Link can be established to activate the camera for live viewing, with or without the animal being present.

In addition to the camera, the feeding system 1 can include one or more speakers and one or more microphones to allow for capturing of sounds, as well as transmission of sounds from a user to the feeding system 1. Recordings of sound and voice may be added as well to allow users to customize messages to the pets.

Through wired or wireless internet access, the feeding system 1 can update the user when a feeding has occurred and may provide additional data collected with the sensors. Type of data collected and sent to the user may vary depending on software and user settings. Such information may be delivered through a specific app developed for the feeding system, by text, email and or other social media or communication preferences that the user may set up. Such data may also be accessible through the display located physically on the feeding system or available on a website portal and stored on the cloud.

Although the feeding system 1 described above is configured to open cans of food, the feeding system 1 can include additional, accessible receptacles for the dispensing of various dry foods, snacks, can extension chutes and/or water.

Various sensors within the feeding system 1 may also be optionally configured to gather data about the humidity level inside and outside the feeding system 1, temperature of the feeding system 1, feeding pattern of the animal, such as amount eaten/wasted, preferred flavor of food, how many times the animal eats and exactly when they fed, among others . . . etc.

Figure 4A:
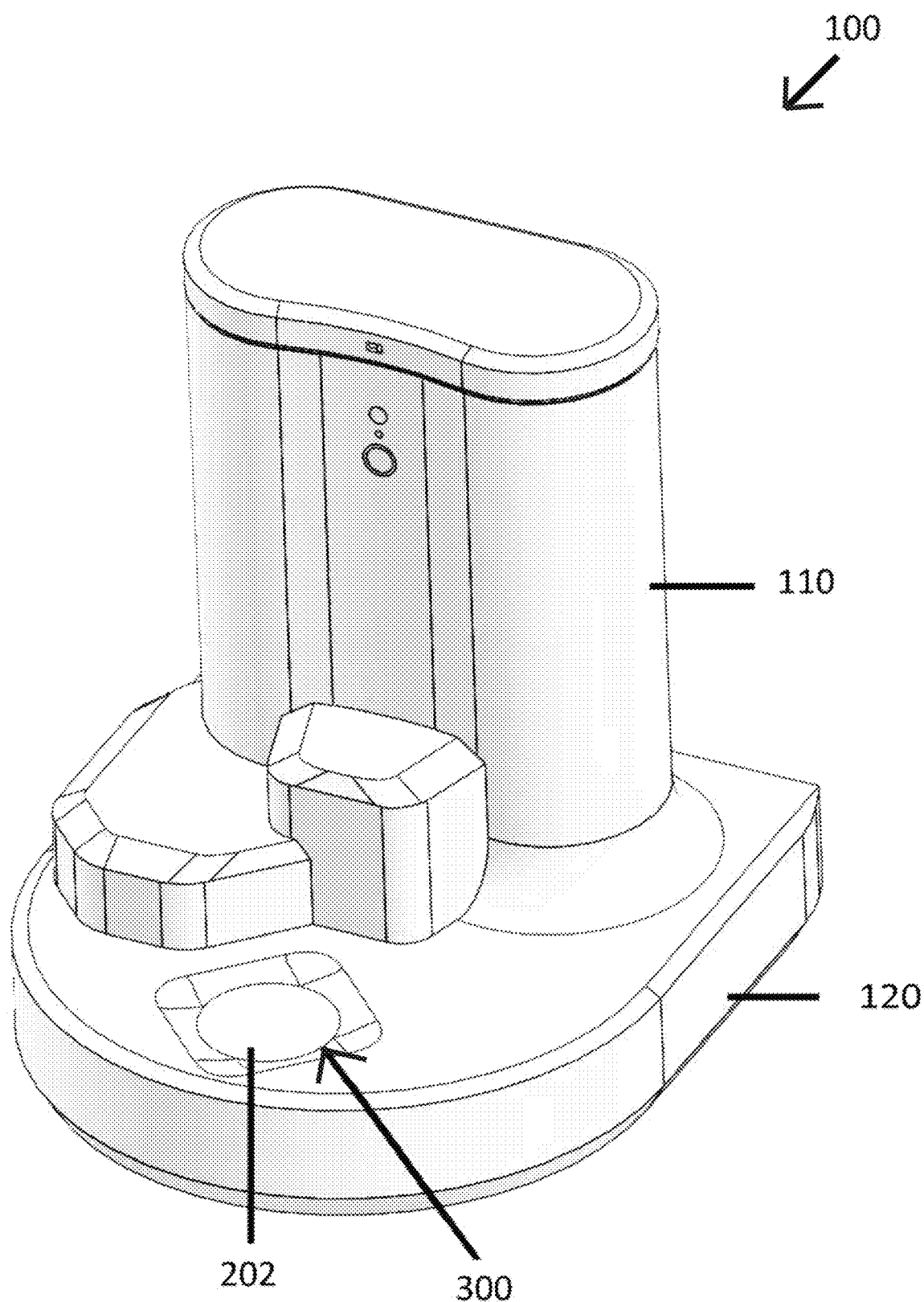
FIGS. 4A and 4B are perspective views of another embodiment of a feeding system.

Another embodiment of a feeding system 100 is shown in FIG. 4A. As can be seen, feeding system 100 is substantially circular (however any suitable shape housing and any suitable shape of the internal components could also be included) and can include several components. The feeding system 100 includes a suitable housing 110 formed of any suitable material (such as plastics, metals, glass, ceramic, rubbers, carbon based materials, and combinations thereof) and a base 120. The housing 110 can be formed of a single piece of material of a suitable shape, or several pieces of material that can be joined to each other in any suitable way. The housing 110 can include a housing opening 300, through which a can can be exposed, as discussed below. The base 120 is configured to attach to and support the housing 110, as well as support the other components within the housing 110.

Figure 4B:
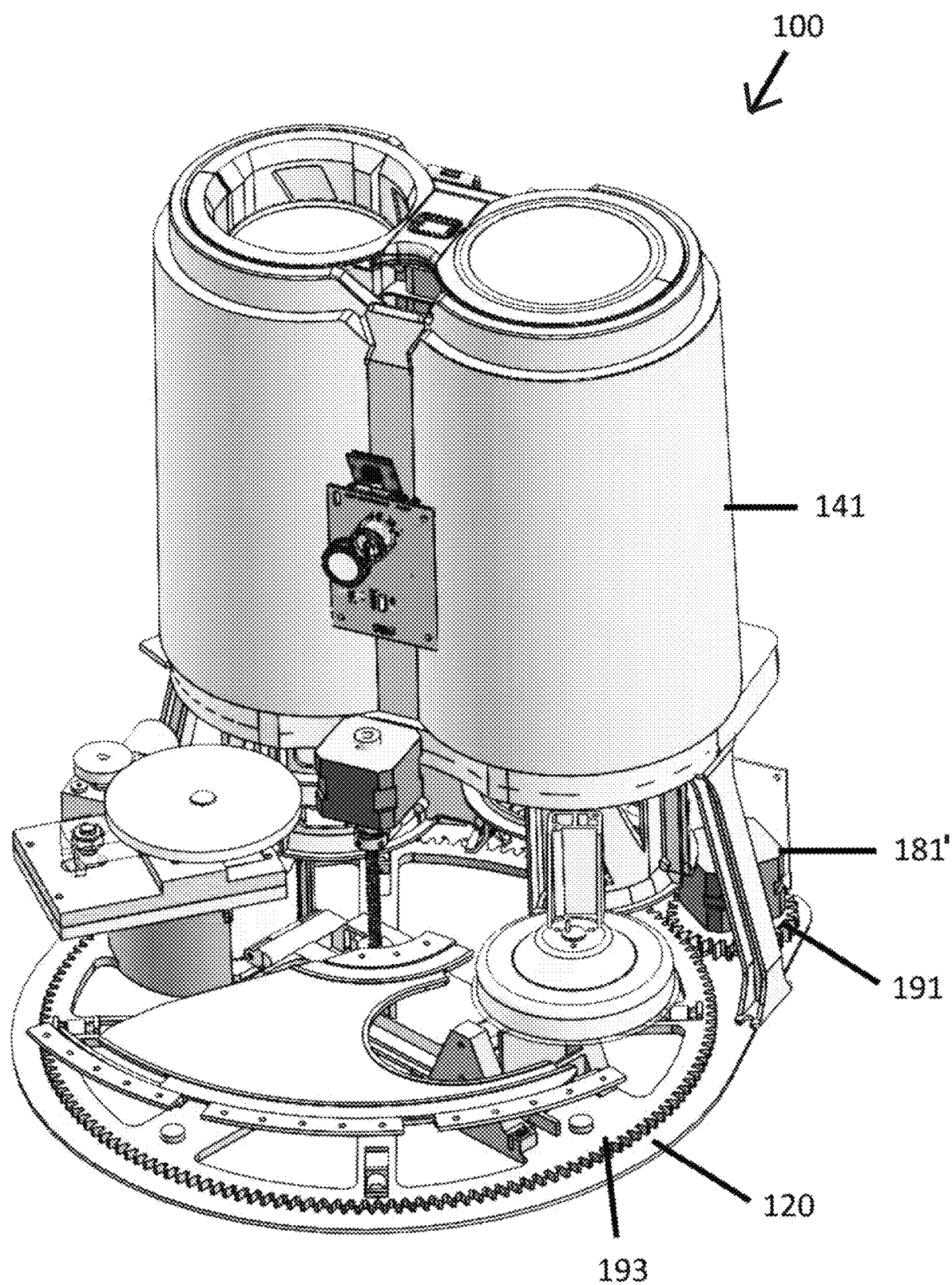

FIG. 4B illustrates the feeding system 100 with the housing 110 removed. As can be seen, several components are supported by the base 120, within the space enclosed by the housing 110. A chute housing 141 is shown, which contains a can chute (discussed in more detail below). The other individual components visible in FIG. 4B are discussed in more detail below.

Figure 5:
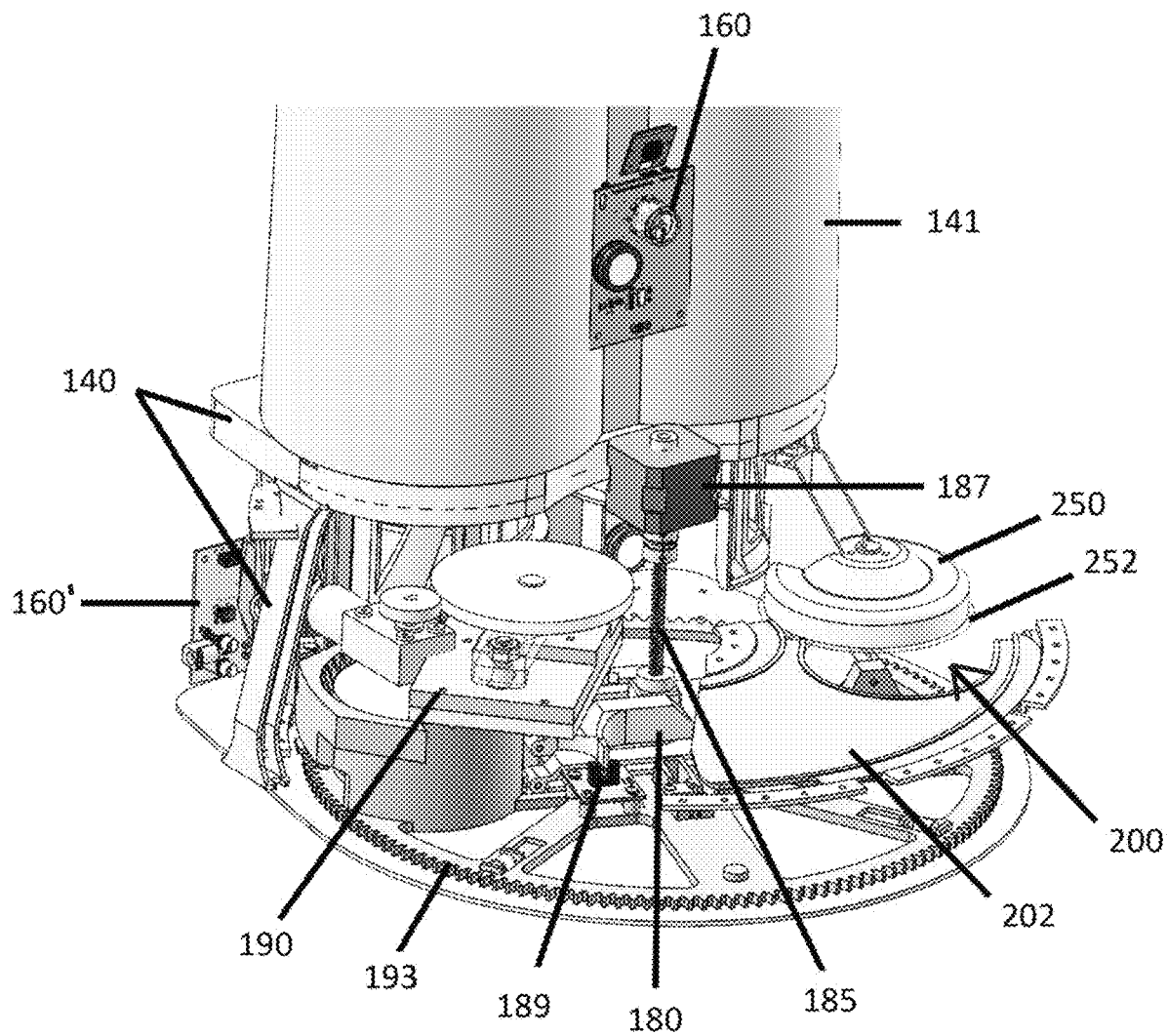
FIG. 5 is a perspective view of the embodiment of the feeding system.

An enlarged view of the several components within the feeding system 100 is shown in FIG. 5. One component is a can chute 130 shown in FIG. 6A, which is supported through a can chute support 140 to the base 120. The can chute 130 can be at least partially or fully surrounded by a chute housing 141. The chute housing 141 can support various other elements of the feeding system 100, such as a control device 160, which will be described below. The can chute 130 can be formed of any suitable material (such as plastics, metals, glass, ceramic, rubbers, carbon based materials, and combinations thereof), and can be rinsed and/or be washable by a user and/or dish washing apparatus.

Figure 6A:
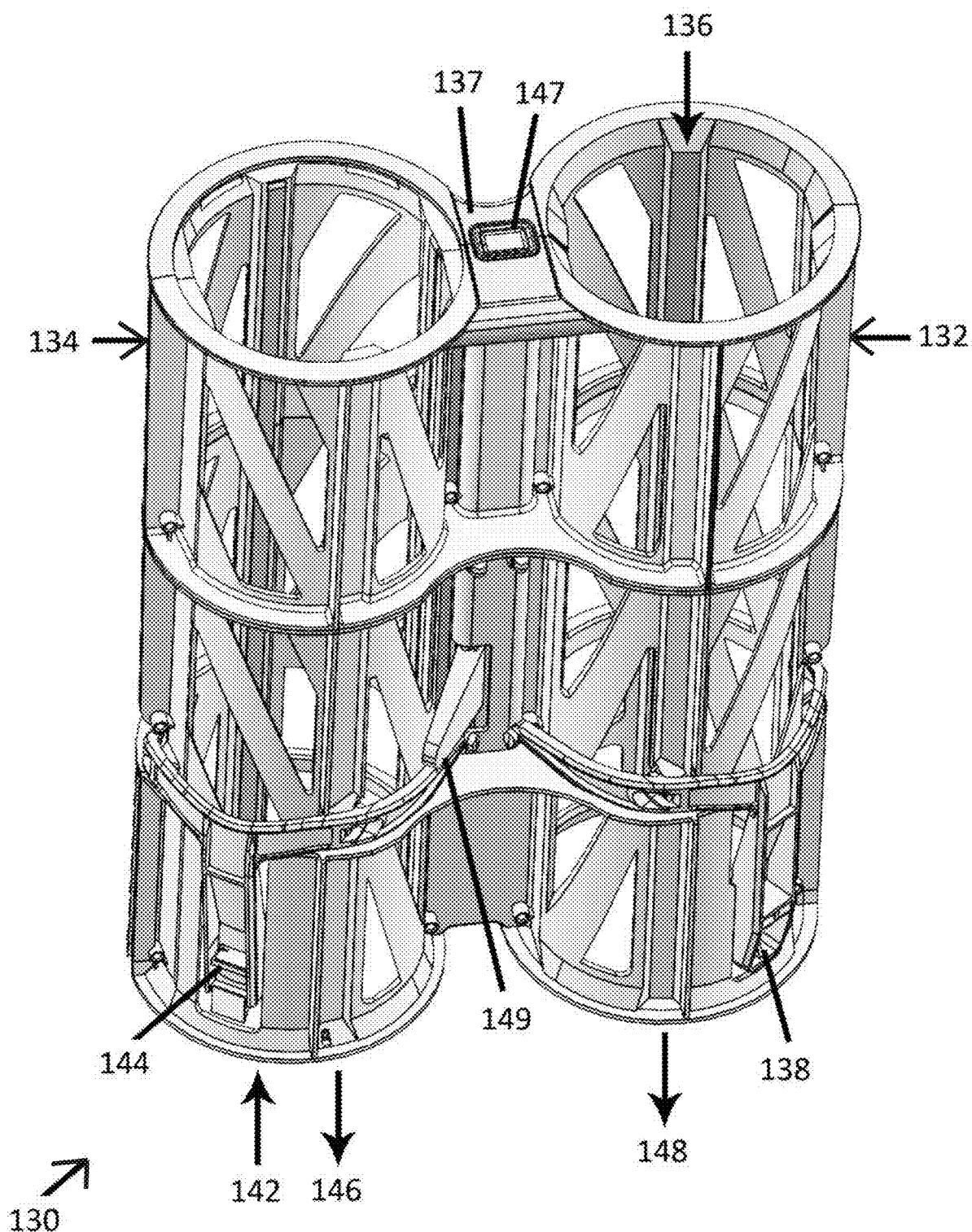
FIGS. 6A-6F are views of elements of the feeding system and can chute.

FIG. 6A shows the can chute 130 alone, upon a removal from the chute housing 141 and the feeding system 100. The can chute 130 includes a sealed can barrel 132 and a used can barrel 134. Each of the sealed can barrel 132 and the used can barrel 134 have a diameter that is dimensioned to contain any suitably sized can. In addition, one or both of the sealed can barrel 132 and the used can barrel 134 can accommodate a spacer (not shown) that can extend around a diameter of a can if that can has a diameter smaller than the diameter of one or both of the sealed can barrel 132 and the used can barrel 134. In some embodiments, one or both of the sealed can barrel 132 and the used can barrel 134 can be tapered, so that their diameter is smaller at one end as compared to the other. In another embodiment, the sides of the sealed can barrel 132 and the used can barrel 134 may be composed of multiple panels which allows them to expand and contract to accommodate any sized cans, including multiple different sized cans all at once.

Each of the sealed can barrel 132 and the used can barrel 134 have a length dimensioned to contain any suitably sized can. For example, each of the sealed can barrel 132 and the used can barrel 134 can be dimensioned to contain 1, 2, 3, 4, 5, 6, 7, 8, 9, 10, 11, 12, 13, 14, 15 or more cans stacked vertically. Two non-limiting examples of suitable cans are 5.5 ounce cans and 3 ounce cans.

An example of the use of the can chute 130 is provided below. In this example the can chute 130 is completely empty of cans. As a first step, the can chute 130 is removed from the feeding system 100. The feeding system 100 may include a lid (shown in FIGS. 6B and 6C) attached to the housing 110, which substantially covers the can chute 130. The user then pulls a portion of the can chute 130 vertically and out of the feeding system 100. The user can then place a sealed can (not shown) into the sealed can barrel 132, in the direction of arrow 136. The sealed can then falls vertically down until it contacts a sealed can catch 138. The sealed can catch 138 sufficiently supports each of the sealed cans added to the sealed can barrel 132. A more detailed view of the sealed can barrel 132, from vertically above is shown in FIG. 6D.

Figure 6B:
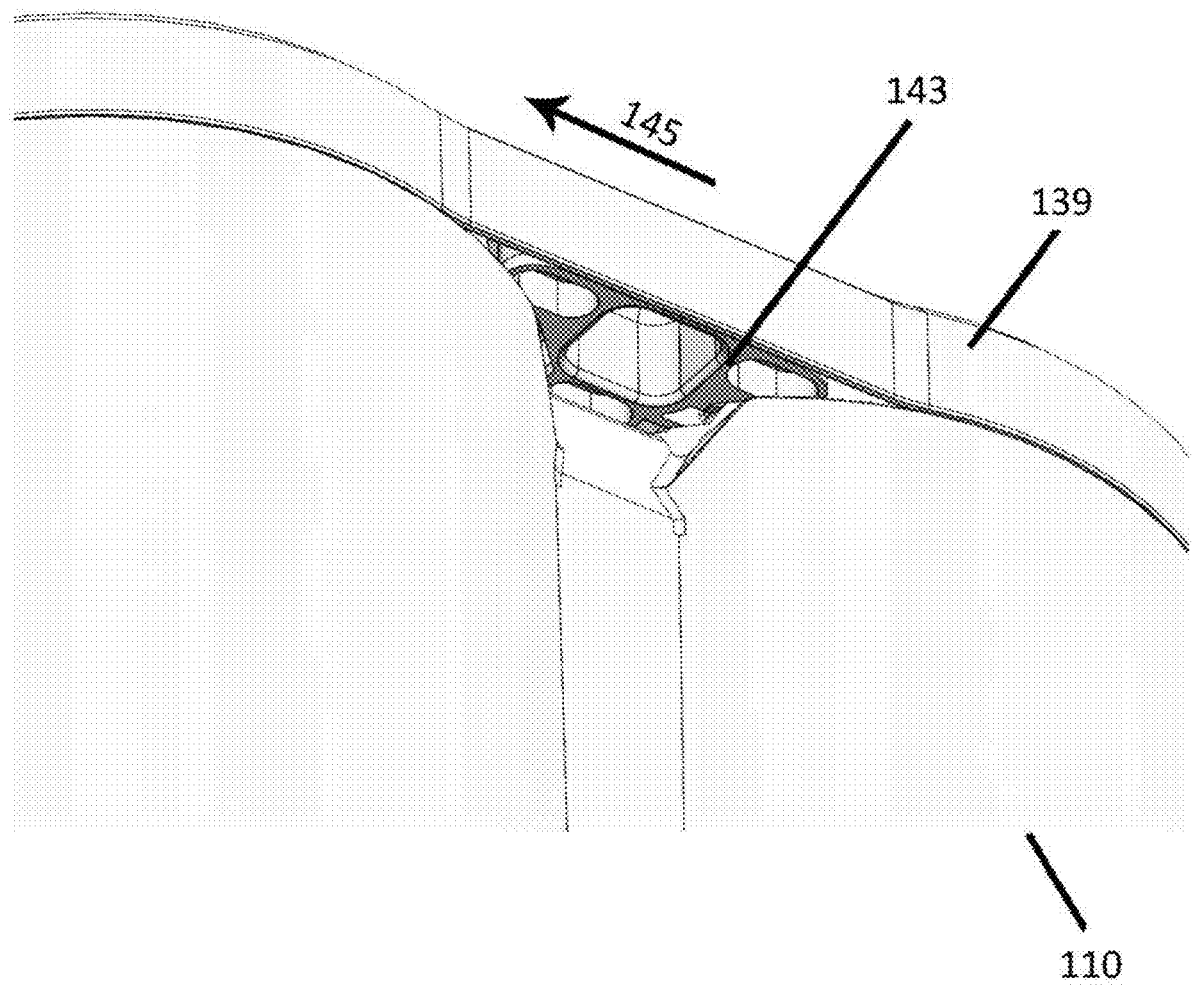
Figure 6C:
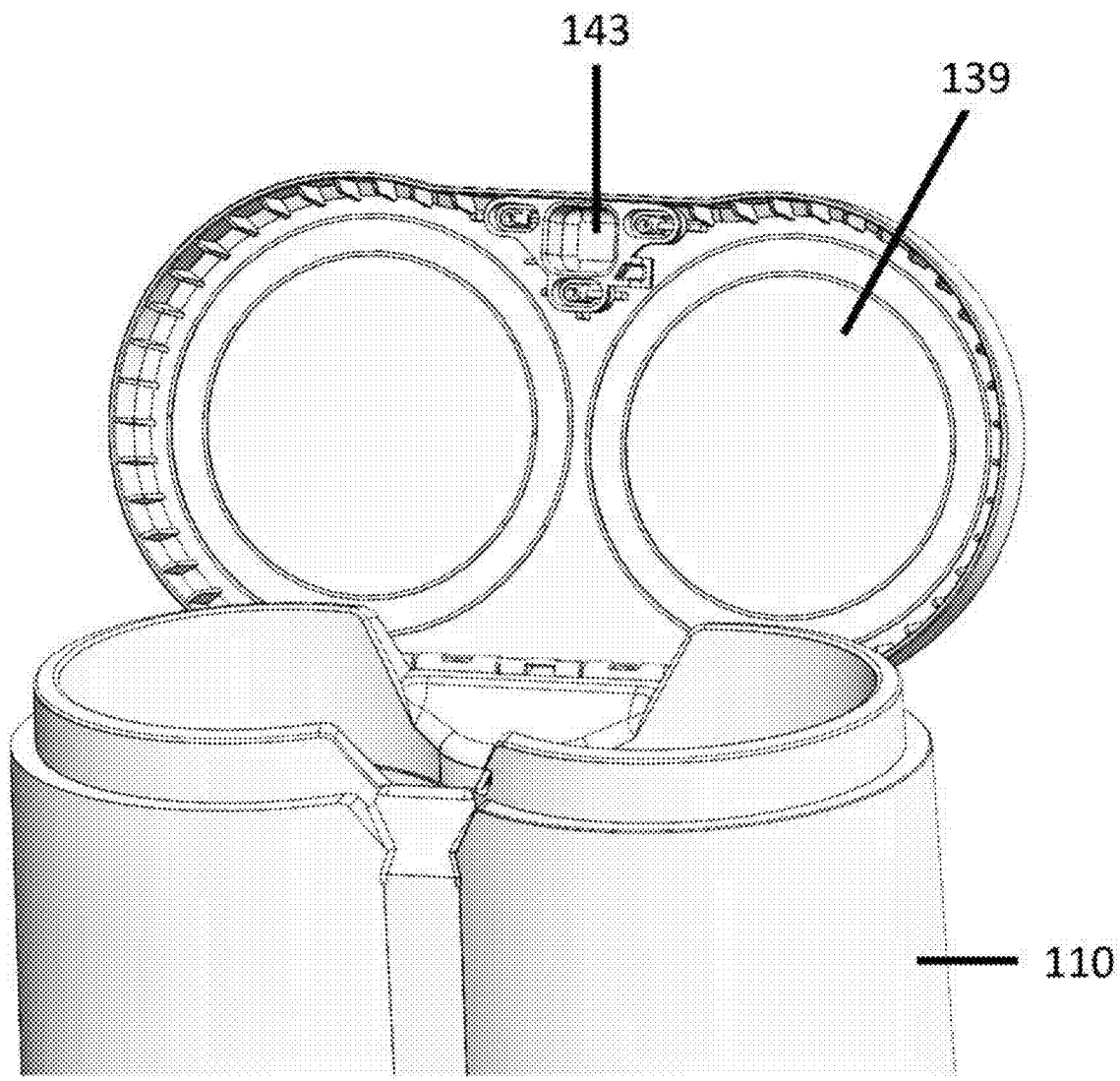
Figure 6D:
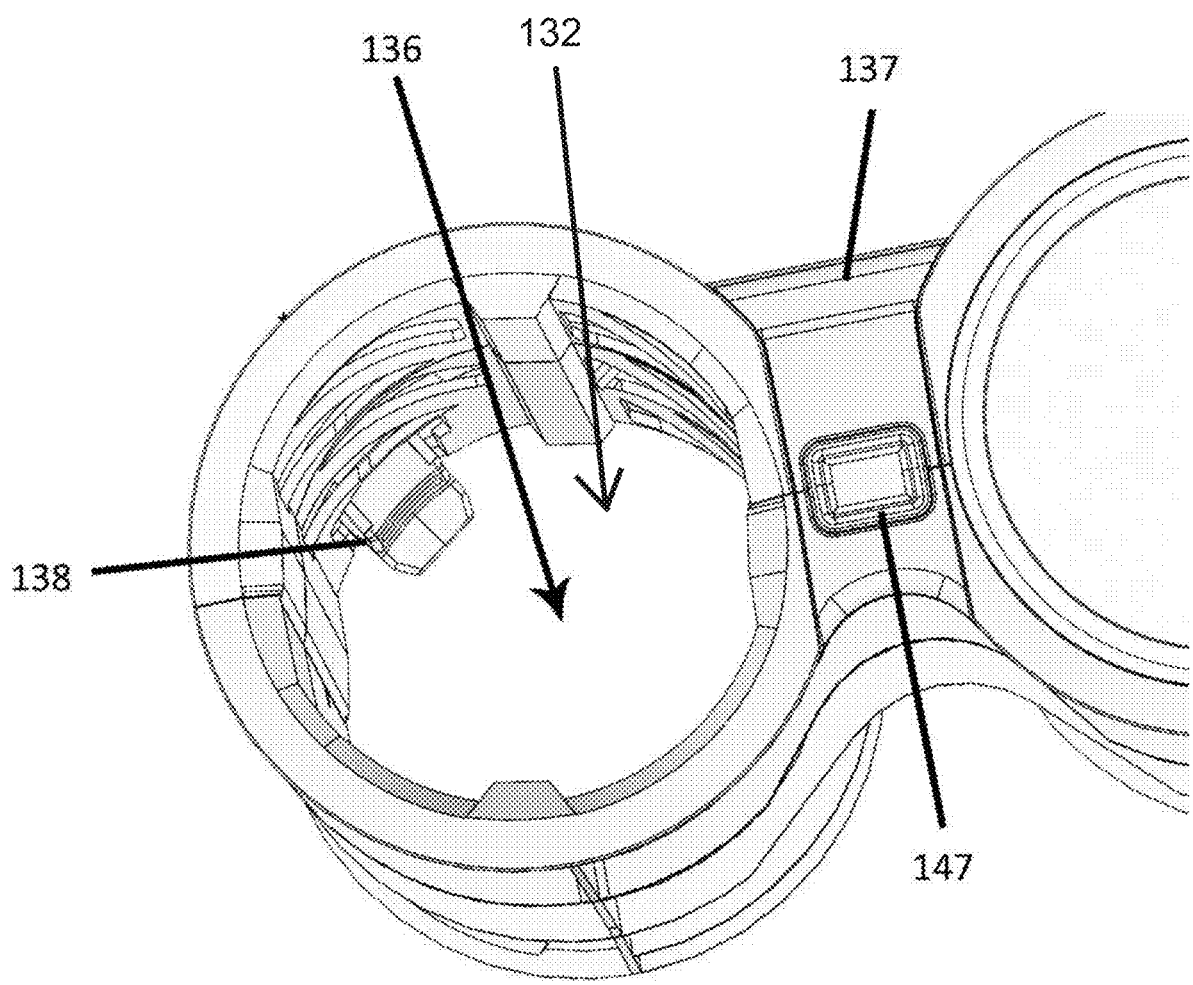

FIG. 6B is a view of the underside of the lid 139, in a closed configuration and in contact with housing 110. A lid latch 143 maintains the lid 139 in contact with the housing 110, by having a portion of the lid latch 143 in contact with a catch of the housing 110. A user can cause the lid latch 143 to slide in the direction of arrow 145, thereby disengaging the portion of the lid latch 143 in contact with the catch of the housing 110. The lid 139 can then be placed in an open configuration, shown in FIG. 6C. The lid being in the open configuration shown in FIG. 6C allows for access by the user to the can chute 130.

Figure 6E:
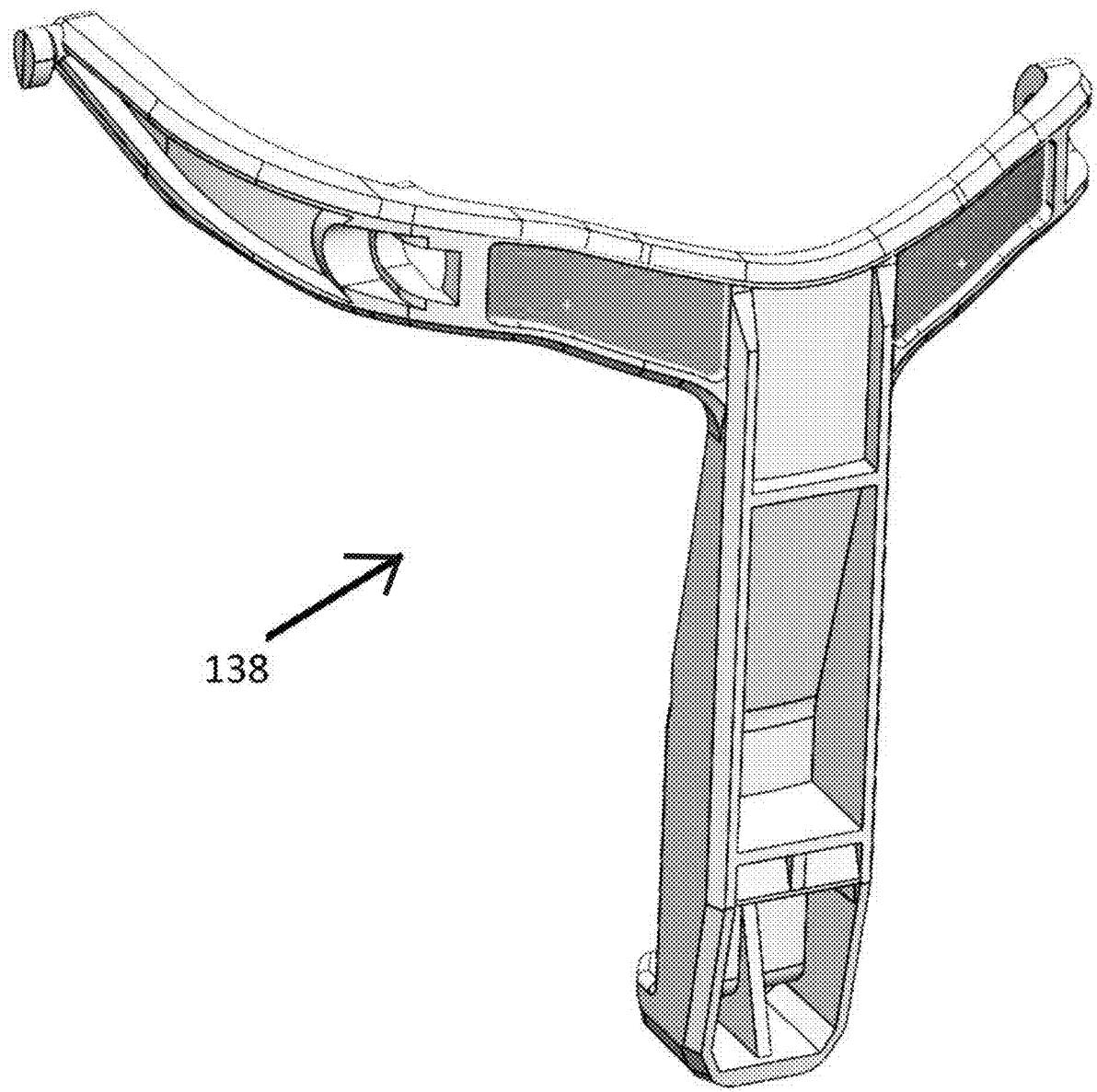

In some embodiments, the sealed can catch 138 can include a shock absorbing element, a curvature designed into the element, which can be configured to absorb at least some of the impact of adding cans in the direction of arrow 136. The sealed can catch 138 is shown separately in FIG. 6E.

Figure 6F:
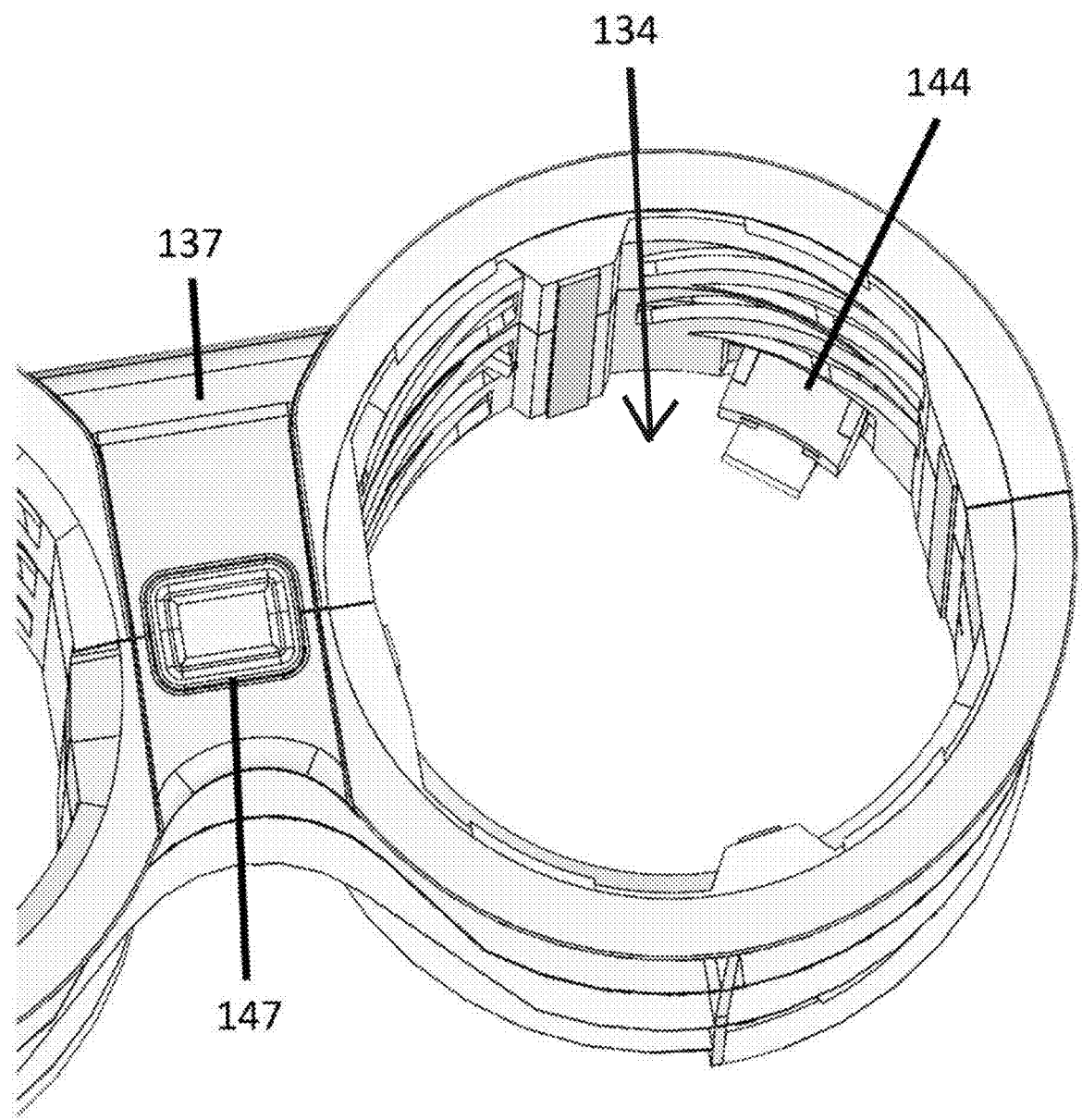

Another example of the use of the can chute 130 is also provided. In this example the used can barrel 134 has received one or more cans in the direction of arrow 142 and are resting on used can catch 144 (this receipt of used cans will be described in more detail below). A more detailed view of the used can barrel 134, from vertically above is shown in FIG. 6F.

As a first step, the can chute 130 is removed from the feeding system 100 by a user. The user will open the lid 139 and pull the can chute 130 out by its handle 137. The can chute 130 can then be held over a garbage receptacle, and a can release button 147 is pressed by the user. Pressing the can release button 147 causes release lever 149 to move vertically downward and contact used can catch 144. This contact causes used can catch 144 to move horizontally away from the interior of used can barrel 134, and the one or more used cans within the used can barrel 134 fall vertically down and out of the used can barrel 134, in the direction of arrow 146. Now that all used cans are removed, and used can barrel 134 no longer contains any used cans or lids. The user can load new sealed cans into the empty sealed can barrel 132 and the can chute 130 can be placed back into the feeding system 100. The can chute 130 will slide into the can chute housing 141. The can chute housing 141 may be straight or may be tapered at the bottom to guide the can chute 130 in with ease.

Referring again to FIG. 5, can chute 130 can be seen, with the exterior of each of the sealed can barrel 132 and the used can barrel 134, both visible below the can chute housing 141. A can enters the interior of the feeding system 100 by exiting the bottom of the sealed can barrel 132 (in the direction of arrow 148 of FIG. 6A) onto a support arm 180 (which is further described, and illustrated, below), while the support arm is in a first position.

Figure 7:
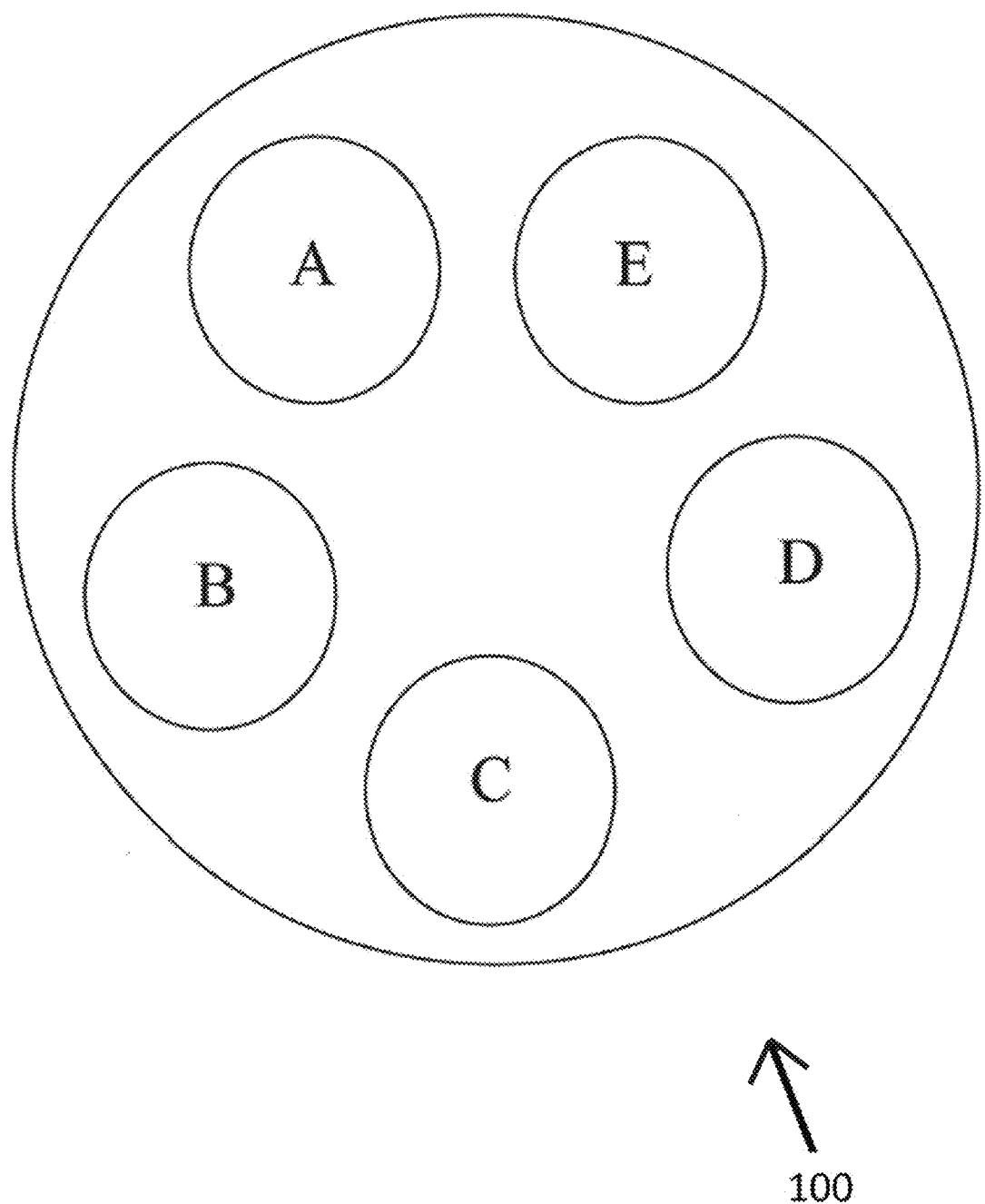
FIG. 7 is an illustration of the various can positions.

For exemplary purposes, and to aid in understanding, FIG. 7 is a graphical representation, although not to scale, to generally illustrate the five positions the support arm 180 can rotate to and be maintained at. For the purpose of clarify, all positions may be configured in any way to be before or after other positions and although only 5 positions are shown, there could be either more or less positions as needed. FIG. 7 is a top view of a representation of the feeding system 100, with positions noted, although not to scale or meant to limit the actual location of any position of the support arm 180. Typically, a can (not shown) travels from position "A", to position "B", to position "C", to position "D", to position "E", with these positions discussed below.

The first position "A" is vertically below a lower opening of the sealed can barrel 132.

The second position "B" is generally where the sealed can has at least a portion of a lid of the sealed can removed.

The third position "C" is generally where the contents of the can, which has had at least a portion of its lid removed, are exposed to an exterior of the feeding system 100. At this position "C", an animal can typically access these exposed contents.

The fourth position "D" is generally where the can, which has had at least a portion of its lid removed, and has been exposed to an exterior of the feeding system 100 for a period of time, is at least partially capped with a capping arm 250 (further described below).

The fifth position "E" is vertically below a lower opening of the used can barrel 134.

Referring again to FIG. 5, as stated above, support arm 180 effects the movement of a can through the positions shown in FIG. 7. Regarding the first position "A", which is vertically below a lower opening of the sealed can barrel 132, a sealed can is released and becomes supported by support arm 180. Before releasing the can, the support arm 180 can lift the entire number of cans within the sealed can barrel 132 to test for weight and thereby determine how many sealed cans are left within the sealed can barrel 132. The support arm 180 will contain a weight measurement device to obtain this data, such as a load cell, discussed below. Alternatively, sensors within or in proximity to the sealed can barrel 132 will provide this data. A more detailed view of support arm 180 is shown in FIG. 8A, with the support arm 180 being in the vertical position it would be to begin supporting the sealed can.

Figure 8A:
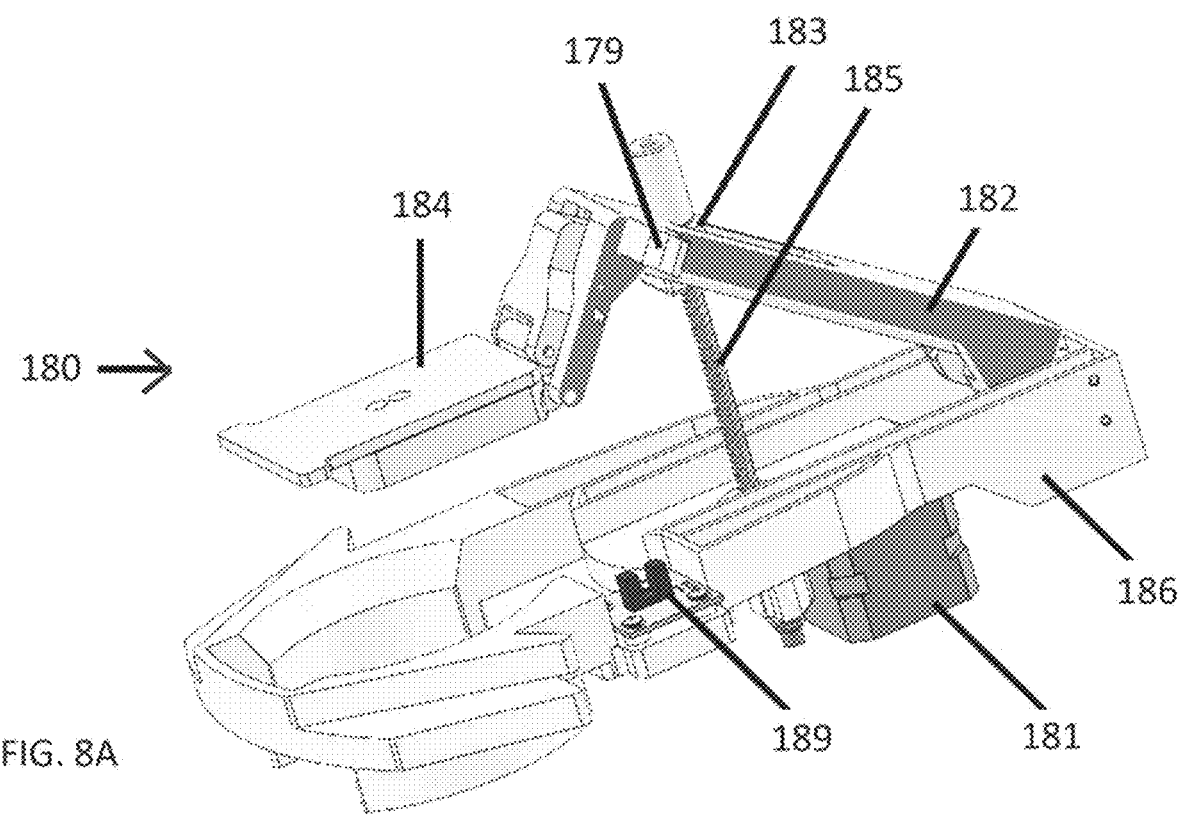
FIGS. 8A-8C are perspective views of the support arm.

As can be seen from FIG. 8A, the support arm 180 includes an elevation arm 182 and a support pad 184. The elevation arm 182 is operably connected to an elevation screw 185 and is configured to pivot about a pivot within a support arm frame 186. Elevation screw 185 is capable of being rotated by an elevation motor (elevation motor 187 of FIG. 5, which is supported by can chute support 140). The operation of the elevation screw is discussed below in regards to rotation being "clockwise" or "counter-clockwise" as an example. In other embodiments, the directions can be reversed using a differently threaded elevation screw 185 to achieve the same movements of the support arm 180.

Figure 8B:
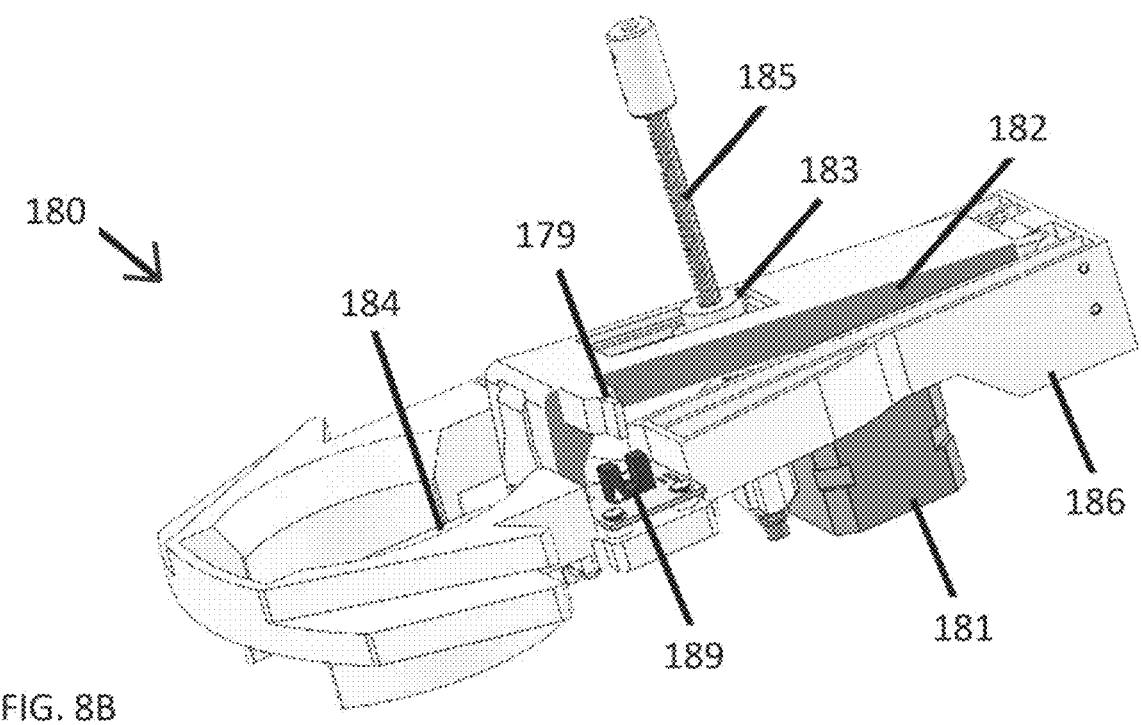

The clockwise rotation of elevation screw 185 by the elevation motor causes the elevation arm to move vertically downward towards the base 120 of the feeding system 100, to a position shown in FIG. 8B. The elevation motor can stop rotation, making the elevation arm 182 any suitable height until an arm protrusion 179 is detected as being present by height sensor 189.

The counter-clockwise rotation of elevation screw 185 by the elevation motor causes the elevation arm 182 to move vertically upwards, away from the base 120 of the feeding system 100, to a position shown in FIG. 8A. The elevation motor can stop rotation, making the elevation arm 182 any suitable height until the elevation arm 182 is stopped because the height stop 183 reaches and is stopped by the top of the elevation screw 185.

The support pad 184 is configured to support sealed and used cans, and includes an electronic weight sensing device, such as a load cell. The electronic weight sensing device is configured to send and/or receive signals from control device 160, which will be described in more detail below. From signals received from the support pad 184, the control device 160 can determine how much food is left in a can that has had at least a portion of a lid of that can removed.

From signals received from the support pad 184, the control device 160 can also determine a weight of all cans in either sealed can barrel 132 or used can barrel 134, by the support pad being placed under either barrel and caused to lift vertically upwards by the elevation screw 185 to support all weight of all cans in either barrel. As an example, from signals received from the support pad 184, the control device 160 can determine how many sealed cans are within the sealed can barrel 132 by measuring a total weight of all cans present, and then divide that total weight by a predetermined, average sealed can weight.

Alternatively, a sensor (not shown) can be included on the interior of or in proximity to one or both of the sealed can barrel 132 and the used can barrel 134 to optically or mechanically determine the height of cans in the barrel, thus determining how many cans are in each of the barrels. Optical sensors may be placed inside, at the top, at the bottom or around the sealed can barrel 132 and/or the used can barrel 134 to determine how many cans are in the barrels. The sealed can barrel 132 and the used can barrel 134 may or may not have cut outs that will allow sensors of this type to work even mounted outside of the barrels. Alternatively, one or more mechanical sensors may be placed inside the sealed can barrel 132 and/or the used can barrel 134 to detect how many cans are in the barrels. These sensors may be indented, lifted, pressed or otherwise manipulated by the cans or lack of cans to determine the fullness of each barrel.

Support arm frame 186 interacts through a suitable gear(s) with a rotation motor 181, which causes support arm frame 186 (including support arm 180) to rotate clockwise and counter-clockwise, between each position shown in FIG. 7.

Both rotation motor 181 and elevation motor 187 are any electrical motors, either AC or DC, that are suitably sized to cause rotation of support arm frame 186 (with one or more sealed or used cans supported on support pad 184) and also suitably sized to vertically lift 1, 2, 3, 4, 5, 6, 7, 8, 9, 10, 11, 12, 13, 14, 15 or more sealed cans stacked vertically within sealed can barrel 132 and used can barrel 134.

Regarding the first position "A" of FIG. 7, which is vertically below a lower opening of the sealed can barrel 132, a sealed can is released and becomes supported by support arm 180. To be in the first position, the rotation motor 181 has caused the support arm frame 186 and support arm 180 to rotate to be vertically below a lower opening of the sealed can barrel 132. To aid in control of the sealed can from the sealed can barrel 132, the elevation motor can cause the support arm 180 to extend vertically upward, to a position shown in FIG. 8A.

In this position a sealed can is released from the sealed can barrel 132 due to sealed can catch 138 moving, and allowing the sealed can to drop. The sealed can then lands on the support pad 184. The support arm 180 (or another suitable portion of the feeding system 100, such as within the sealed can barrel 132, or near position "B" of FIG. 7) can include a scanner (not shown). This scanner can be any suitable scanner, including optical scanners and laser scanners, that is capable of decoding data stored in a barcode, a QR code, or any equivalent scannable/detectable coding option used for tracking purposes on a can. This data can be received by the control device 160, and will be described in more detail below.

Optionally, the support arm 180 (or another suitable portion of the feeding system 100, such as within the sealed can barrel 132, or near position "B" of FIG. 7) can include a second scanner (not shown). This second scanner can be any suitable scanner or device (in conjunction with control device 160) that is capable of determining if a sealed can is in the correct orientation (right side up, or the rolled lip and lid of the can is vertically further away from the base 120 of the feeding system than the bottom of the can).

Figure 9:
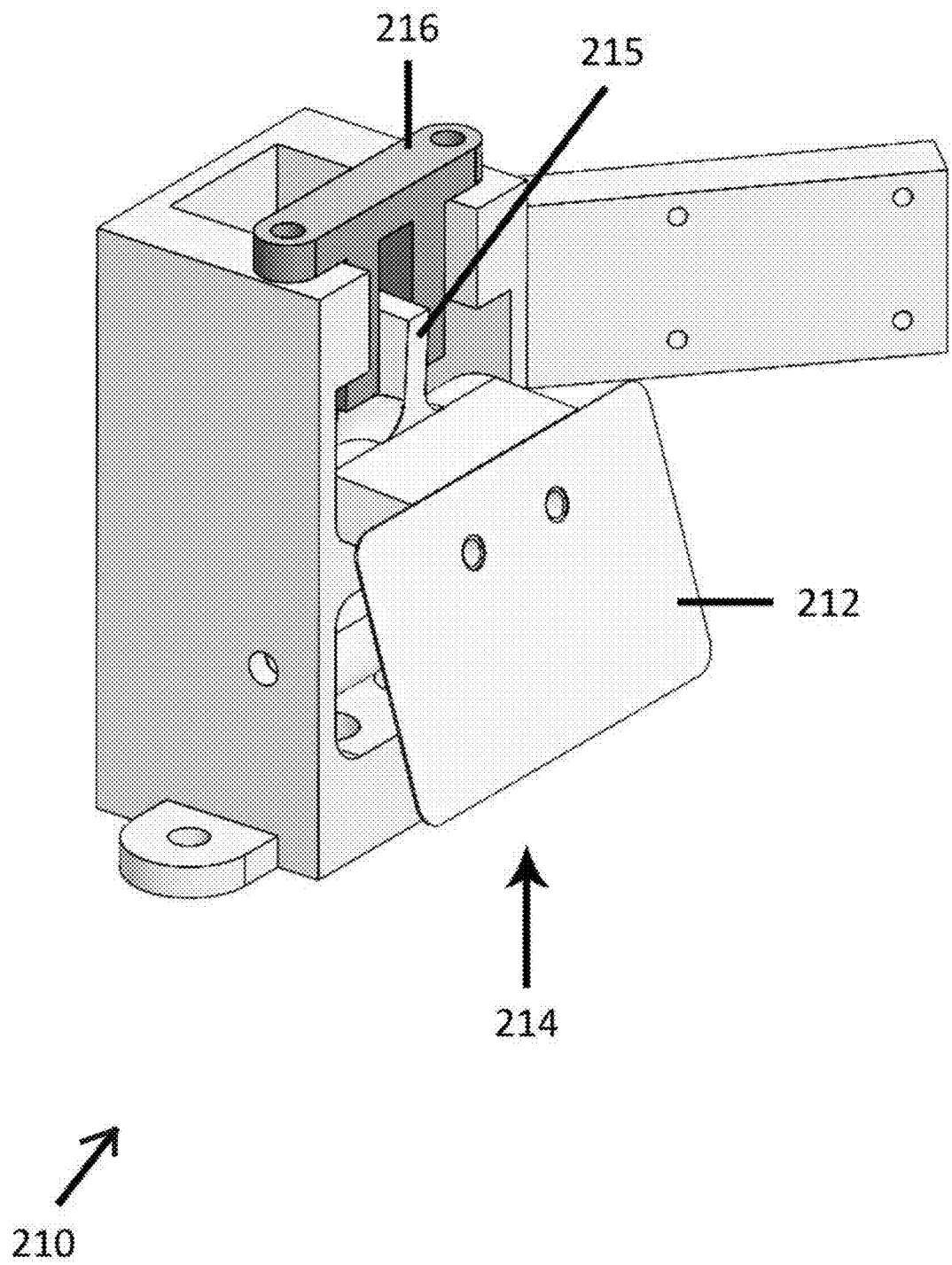
FIG. 9 is a perspective view of the edge detection element.

Alternatively, during dispensing, the support pad 184 can catch the sealed can from the opening at the bottom of the sealed can barrel 132. Before moving on to position "B" to open the can, the support pad 184 will be elevated slightly again and the can will rub against an edge detector 210, shown in FIG. 9. The edge detector 210 can be located in any position between position "A" (including position "A") and position "B".

The edge detector 210 includes a blade 212 configured to catch on the rim of a can, as the can moves in the direction of arrow 214. If the can was upside down, the lip of the lid of the can will catch on the blade 212 and the edge detector 210 will notify the control device 160. As the rim of the can catches the blade 212, the mechanism rotates so that blade protrusion 215 moves and is detected by blade protrusion sensor 216. The blade 212 will not catch if the can is right side up, with the rim at the top. If the can is right side up, the sealed can can proceed to position "B".

If the edge is caught, the control device 160 will be notified by the blade protrusion sensor 216, the sealed can can be caused to move to position "E", and placed into the used can barrel 134. The process can then start over with a new can. The user can be notified of such an event by the control device 160. In another embodiment, device can opener 190 can be configured to sense if the can is right side up. This may be determined from feedback received by the control device 160 of the grip of the blades of the can opener on the can or lack thereof. This may also be determined by the control device 160 from the amount of current drawn by the motor as the can opener 190 is operating on the can. The structure of the can opener 190 is further described below.

After receipt of the sealed can by the support arm 180 in position "A", and after clockwise rotation of elevation screw 185 to place the support arm 180 in the position shown in FIG. 8B, the rotation motor 181 rotates and causes the support arm 180 to rotate counter-clockwise from position "A" to position "B" of FIG. 7. At position "B" the elevation screw 185 rotates counter-clockwise and the support arm 180 (and sealed can thereon) is lifted vertically towards the can opener 190. Alternatively, at position "B", the elevation screw 185 does not rotate and the can opener 190 moves vertically downwards.

Figure 10A:
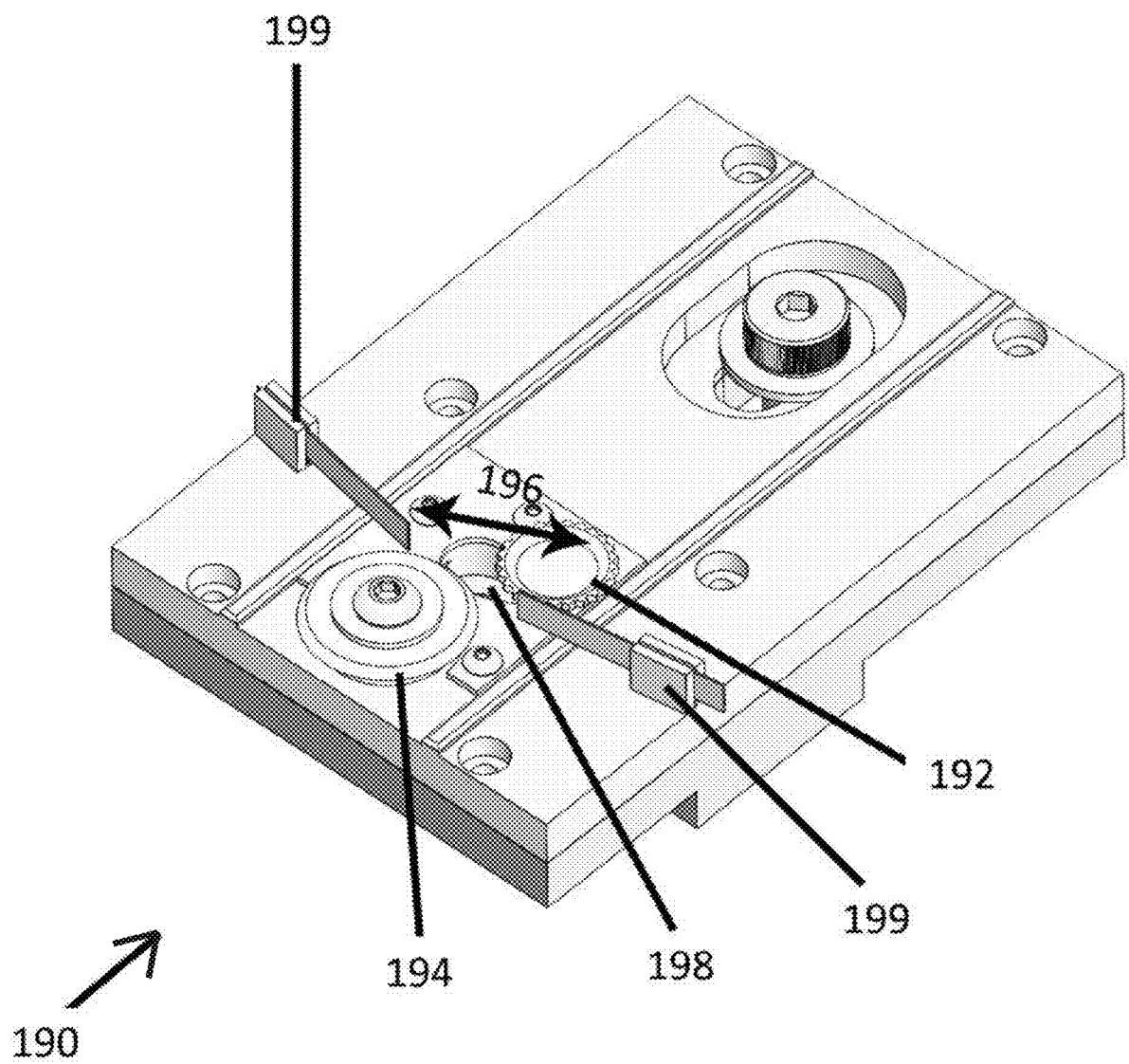
FIGS. 10A and 10B are perspective views of the can opener.
Figure 10B:
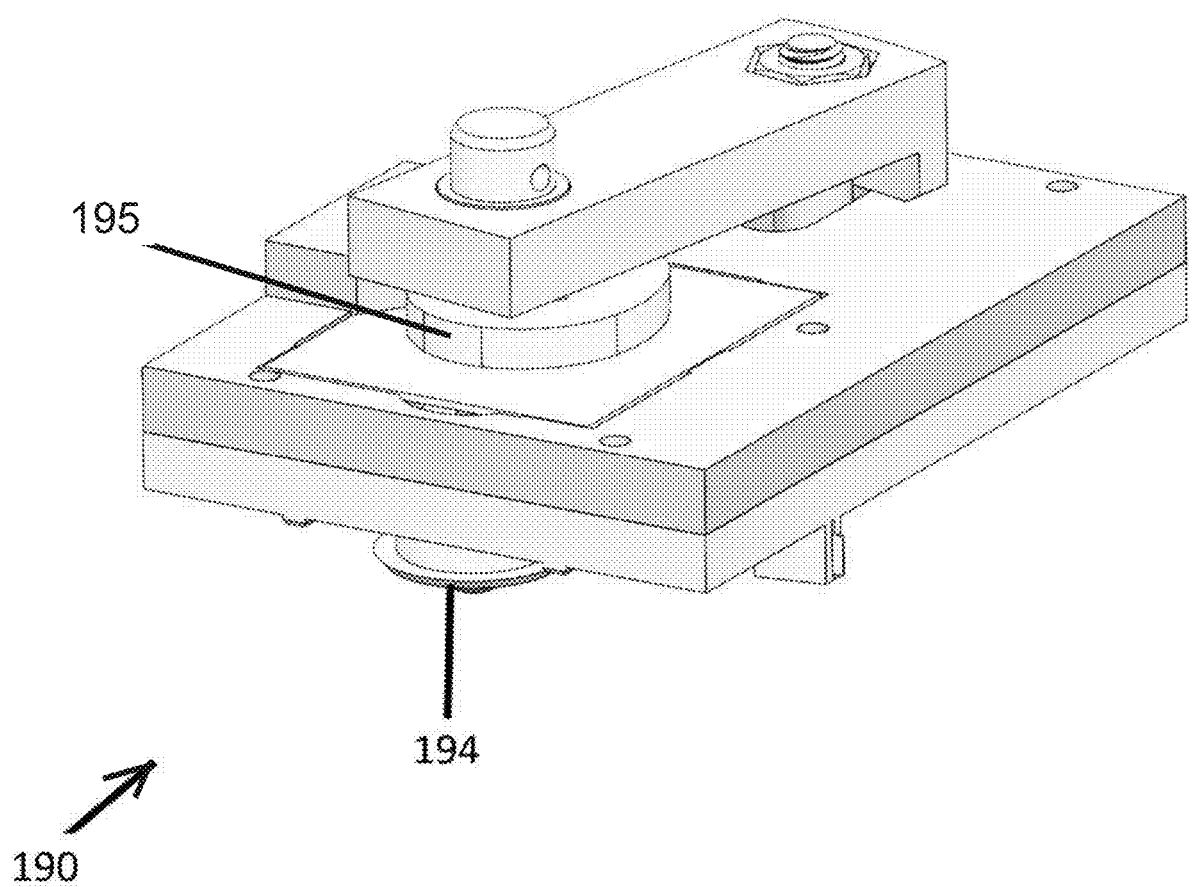

As seen in FIG. 10A, which is an underside view of the can opener 190, the can opener 190 includes a feed gear 192, a cutter 194, and lid extractors 199. The feed gear 192 is moved by a can opener motor (not shown) that is on top or located anywhere within the feeding system 100 and is configured to contact and cause the can to rotate against the cutter 194, such that the cutter 194 cuts through a side wall of the can. In alternative configurations, the feed gear 192 can contact and cause the can to rotate against the cutter 194, such that the cutter 194 cuts through an upper surface wall of the can. In yet another embodiment of can opener 190, a pinching mechanism (not shown) can contact and pinch a flap handle of a can, and peel the upper flap off of the can. The feed gear 192 is configured to move in the direction of arrow 196 through feed gear groove 198 by forwarding and reversing the direction the motor is turning. As shown in FIG. 10B, rotation of cam 195 (through the motor (not shown)) causes the cutter 194 to more in the direction of arrow 196 in FIG. 10A. Under any of the above embodiments, the can opener 190 results in a substantially dull upper metal edge of the can and a removed lid. As used herein, the removed lid refers to any material removed from the sealed can by the can opening process.

After the sealed can is opened, by any suitable method, the removed lid can be maintained by the can opener 190 until after the support arm 180, and now opened can, have moved from position "B" of FIG. 7. At that time, the can opener 190 can release the removed lid by utilizing the lid extractors 199 which will help push the lid out of the grip of the cutter 194 and/or feed gear 192, so that the removed lid falls vertically down into a receptacle (not shown) which can later be removed by a user. Alternatively, the can opener 190 can maintain the removed lid until after the opened can has completed position "C", or after the opened can has completed position "D", both described below in more detail. In this alternative embodiment, the rotation motor 181 rotates and causes the support arm 180 to rotate clockwise from either position "C" or position "D" back to position "B", and the removed lid is then released so that the removed lid falls vertically down onto the can, which has now been used.

After the sealed can has been opened at position "B", the rotation motor 181 rotates and causes the support arm 180 to rotate counter-clockwise from position "B" to position "C" of FIG. 7. At position "C" the elevation screw 185 rotates counter-clockwise and the support arm 180 (and opened can thereon) is lifted vertically towards a feeding opening 200. The opened can is lifted to be below the feeding opening, 200, partially exposed through feeding opening 200, or offset a distance below the feeding opening 200. At this time, an animal can access the contents of the opened can and eat at least a portion or all of the contents. Alternatively, the can can be extended outside of the housing 110 to present the food to the animal and then retracting back once finished or per scheduled settings.

During the time that access to the contents of the opened can is available, the support pad 184 can measure the weight of the opened can at various times, and transmit that information to the control device 160, such that the weight of the can at the time of opening can be compared to the weight of the opened can over time. These weight measurements can be used by the control device to determine an amount of material remaining in the opened can, and can be used to restrict access to the opened can if the contents are being removed too quickly. Further actions undertaken by the control device 160 are discussed below.

The feeding opening 200 can include a lip that extends vertically downwards, which substantially covers the exposed edge of the opened can. Also, the feeding opening 200 can include an inclined portion, which extends radially from the feeding opening 200 and is inclined vertically downward towards the feeding opening 200.

Optionally, the feeding opening 200, when the opened can is not in position "C", can be covered with an opening cover 202, which extends over the feeding opening 200. The opening cover 202 can be maintained, when an opened can is not in position "C", in a closed configuration by the force of an elastic element (shown in FIG. 11). To move the opening cover 202, thus exposing the feeding opening 200, instead of stopping at position "C", the rotation motor 181 rotates and causes the support arm 180 to rotate counter-clockwise from position "B", past position "C" a distance, which is prior to position "D". At that time, the support arm 180 (and opened can thereon) is lifted vertically a predetermined distance by rotation, counter-clockwise, of the elevation screw 185. Then, the rotation motor 181 rotates and causes the support arm 180 to rotate clockwise back towards position "C", so that a portion of support arm 180 contacts an opening cover portion (shown in FIG. 11) on a lower surface of the opening cover 202. The rotation motor 181 continues to rotate clockwise, causing the opening cover 202 to move clockwise, exposing the feeding opening 200.

Figure 11:
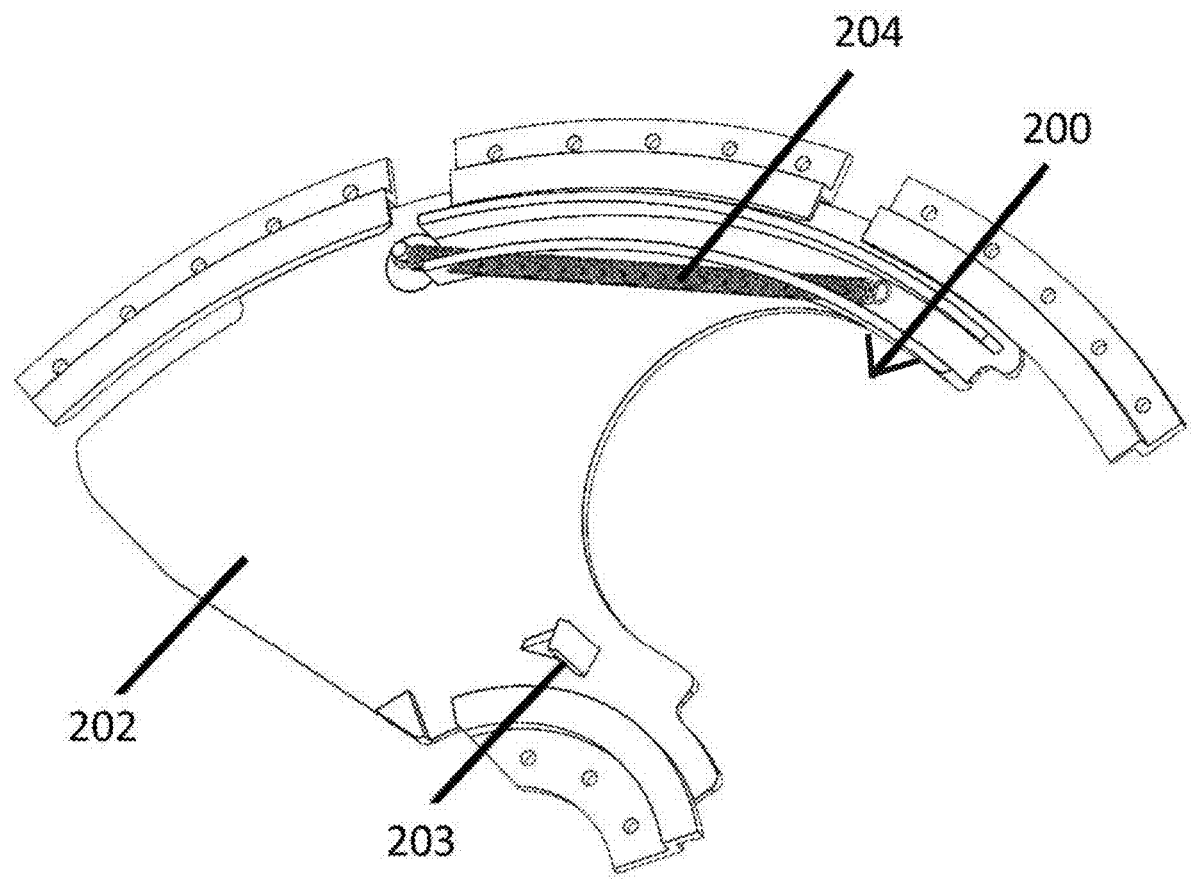
FIG. 11 is an underside view of the opening cover.

FIG. 11 is a portion of the opening cover 202, from an underside perspective. From this view, the opening cover portion 203 that contacts the support arm 180 can be seen as extending from a surface of the opening cover 202. In the configuration shown in FIG. 11 (and in FIG. 4A), the opening cover 202 is in a closed position, held by an elastic element 204 (such as a spring or an elastomeric element, or the like) between the opening cover 202 and a fixed portion of the feeding system 100. Once the support arm 180 contacts the opening cover portion 203, and forces the opening cover 202 to rotate in a counter-clockwise direction of FIG. 11, the feeding opening 200 moves to substantially align with the housing opening 300, thus exposing the can to outside of the housing 110. Once the support arm 180 moves to position "D", the elastic element 204 causes the opening cover to rotate in a counter-clockwise direction of FIG. 11 so that feeding opening 200 is no longer substantially aligned with the housing opening 300 and the opening cover 202 itself is exposed through the housing opening 300, as seen in FIG. 4A.

In another embodiment, the opening cover 202 can be moved through an additional motor (not shown) to expose the feeding opening 200. In another embodiment, the opening cover 202 is moved as the support arm 180 rotates from position "B" to position "C" through contact between a portion of the support arm 180 and a portion of the opening cover 202.

Under any of the above embodiments, once opening cover 202 is moved, at position "C" the elevation screw 185 rotates counter-clockwise and the support arm 180 (and opened can thereon) is lifted vertically towards a feeding opening 200. In other embodiments, once at position "C", the feeding opening 200 is near enough to the can to allow for access to the can's contents without the support arm 180 moving vertically up or down.

After a predetermined period of time or amount eaten, the elevation screw 185 rotates clockwise and the support arm 180 (and used can thereon) is moved vertically down and away from the feeding opening 200. Then, the rotation motor 181 rotates and causes the support arm 180 to rotate counter-clockwise from position "C" to one of position "D" or position "E" of FIG. 7.

If the rotation motor 181 rotates to position "D", the elevation screw 185 then rotates counter-clockwise and the support arm 180 (and used can thereon) is lifted vertically towards the capping arm 250. In other embodiments the support arm 180 remains stationary while the capping arm 250 is moved towards the support arm 180. The capping arm 250 includes a ring 252 made of a substantially compliant material, such as an elastomeric material, that extends around the circumference of the capping arm 250, which is configured to be elastically deformable upon contact with an exposed edge of the used can. Once contact is made between the ring 252 and the used can, a substantially air tight seal is formed between the contents of the used can and the environment around the feeding system 100. In another embodiment, the capping arm 250 may be larger in circumference than the can and can be placed over the can without touching any part of the can.

Optionally, the capping arm 250 can also include one or more lights (shown in FIG. 12) that are capable of at least partially limiting bacterial and/or mold growth on the contents of the used can. One example of these one or more lights is an ultra violet (UV) light and a light emitting diode (LED). The light may be used any time for any amount of time and may be programmable by the user.

Figure 12:
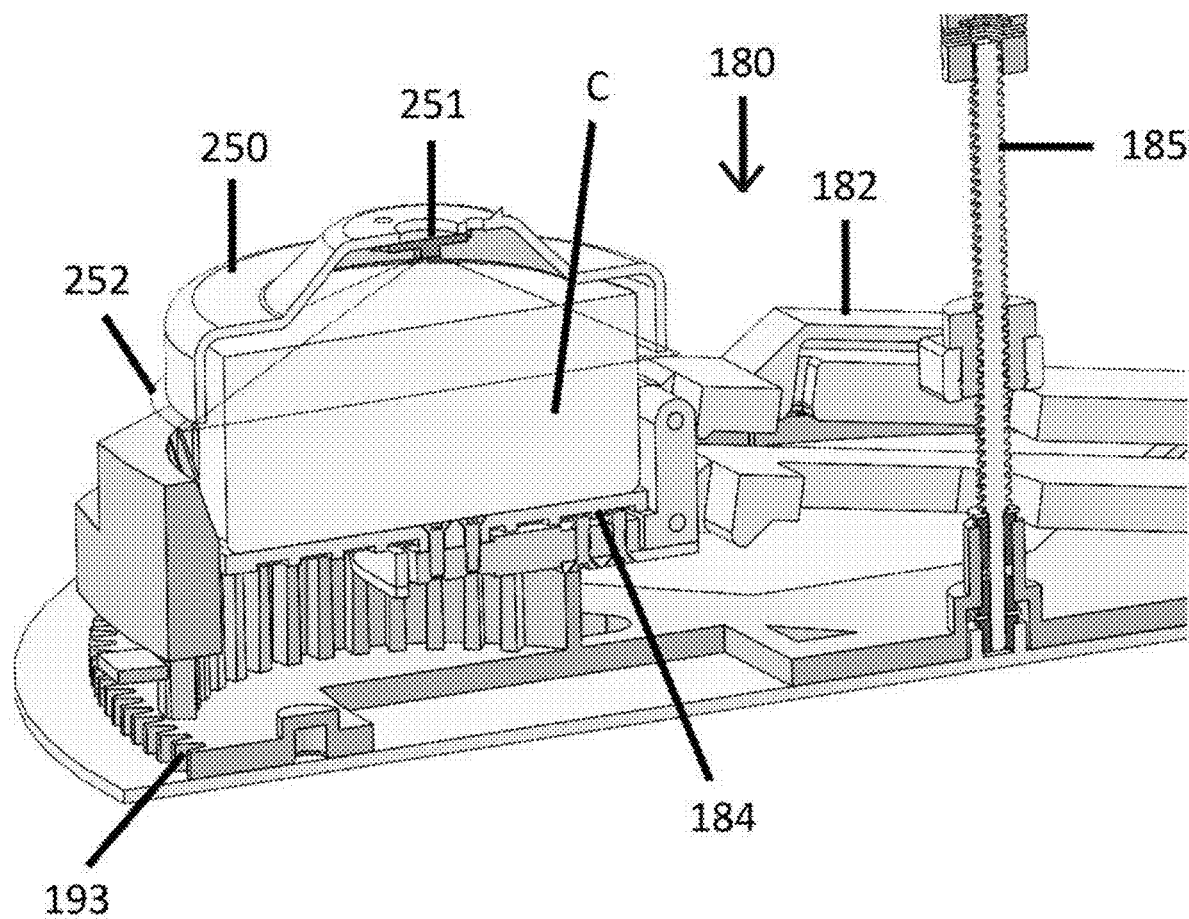
FIG. 12 is a cross-sectional view of the capping arm.

A side cross-sectional view of the capping arm 250 is shown in FIG. 12. In FIG. 12 a used can C is shown as being in contact with a portion of the ring 252. A light 251 is on an underside surface of the capping arm 250 and emits a light towards the used can C.

After a predetermined period of time, the elevation screw 185 then rotates clockwise and the support arm 180 (and used can thereon) is lifted vertically away from the capping arm 250. At this time, the rotation motor 181 can rotate counter-clockwise, back to position "C", or the rotation motor 181 can rotate clockwise, to position "E". If the rotation motor 181 rotates back to position "C", the used can can be exposed again through the feeding opening 200. This process can continue multiple times, with the rotation motor 181 causing the used can to move from position "C", to position "D", to position "C", to position "D", etc. for a predetermined period of time or amount eaten or as per scheduling settings made by the user.

After a period of time or amount eaten or as per scheduling settings made by the user, the used can is caused to move into position "B" to pick up the lid and then to position "E" by the rotation motor 181. Position "E" is vertically below a lower opening of the used can barrel 134. Upon reaching position "E", the elevation screw 185 then rotates counter-clockwise and the support arm 180 (and used can thereon) is lifted vertically towards the bottom face of the used can barrel 134. The elevation screw 185 will continue to rotate until the lower edge of the used can passes the used can catch 144. After the lower edge of the used can passes the used can catch 144, the used can is then supported by used can catch 144.

If there are already one or more used cans present in the used can barrel 134, the elevation screw 185 causes the used can just brought to position "E" to push vertically upwards the one or more other used cans already present in the barrel until the lower edge of the used can that was just brought to position "E" passes the used can catch 144. After the lower edge of the used can that was just brought to position "E" passes the used can catch 144, all used cans in the used can barrel 134 are then supported by used can catch 144.

Optionally, an interior surface of the used can barrel 134 can include, 1, 2, 3, 4, 5, or more vertical rails (not shown), which can be formed of any suitable material (such as plastics, metals, glass, ceramic, rubbers, carbon based materials, and combinations thereof). These vertical rails can extend a portion of the vertical length of the used can barrel 134, or a majority or all of the vertical length of the used can barrel 134. These vertical rails can aid in preventing an edge of a used can being caught, or cutting into a portion of the used can barrel 134 itself.

In another embodiment, a rotation motor 181' can be located in the position shown in FIG. 4B, which through rotation of motor gear 191 causes the entire carousel 193 to rotate through interaction with motor gear 191 and teeth on the exterior circumference of carousel 193. In this embodiment, the support arm 180 can be attached to the carousel 193 and the support arm 180 can rotate with the carousel 193 to the locations discussed above.

Figure 8C:
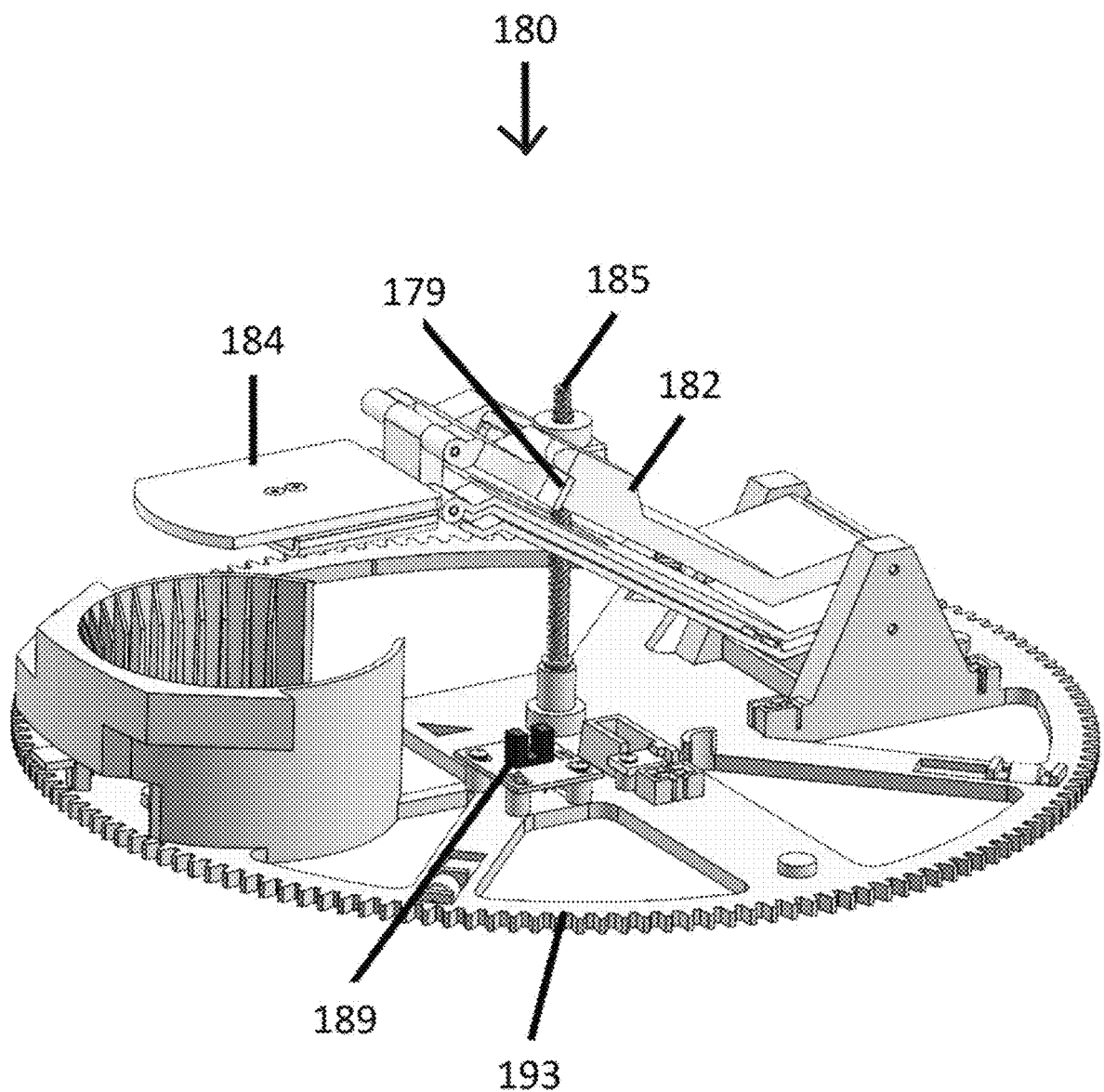

This alternative embodiment is shown in FIG. 8C, which includes the carousel 193 and support arm 180 separate from the other components of the feeding system 100. In this embodiment, the elevation arm 182 is moved vertically upwards and downwards as in the first embodiment.

As used herein, the term control device 160 refers to all components in, on, or attached to an electrical board. Some components of the control device 160 can be in the location shown in FIG. 5 and/or some components of the control device can be located on control device 160', also shown in FIG. 5. In an example embodiment, the control device 160 can include one or more of a processor, a memory, a network interface, and/or an image sensor (e.g., a camera). The network interface can send and receive various signals, such as WiFi signals, Bluetooth® signals, etc. The control device 160 can be configured to receive various inputs from components of the feeding system 100, or from other devices external to the feeding system 100. Also, each of the actions received by or produced from the control device 160 can be processed locally, on the control device 160, and/or, be transmitted to an external server, such as a cloud database, for processing.

In one example, the control device 160 can receive inputs from a mobile phone external to the feeding system 100, where these received inputs can be processed by the processor of control device 160 to control operations of the components of the feeding system 100.

The control device 160 is configured to receive signals from the electronic weight sensing device on the support pad 184. The control device 160 can send a signal to the electronic weight sensing device to make a measurement and, then, the control device 160 can receive the output signal from the electronic weight sensing device at any time, such as when the support arm 180 is at any of positions "A", "B", "C", "D", and "E", or between these positions. These received signals can be used by the control device 160 to determine the amount of contents of each can that has been removed (eaten by an animal), over time. These signals can also be used by the control device 160 to determine if there is an increase in weight, which could indicate a foreign object has been placed in the used can, or if an animal has regurgitated in the used can. If the control device 160 does make this determination, an alert can be transmitted through the interface that a fault has been detected. If a fault is detected, the control device 160 can stop all movement of all elements within the feeding system 100 (to allow for a user to manually remove the used can) or automatically move the used can into the used can barrel 134, and then retrieve a sealed can from the sealed can barrel 132.

In other embodiments, the control device 160 can determine that when a remaining weight of a used can is below a threshold, the control device 160 can automatically move the used can into the used can barrel 134.

Also, the control device 160 can send a signal to the electronic weight sensing device to make a measurement and, then, the control device 160 can receive the output signal from the electronic weight sensing device to determine a weight of all initial (or remaining) sealed cans in the sealed can barrel 132. These received signals can be used by the control device 160 to determine the number of sealed cans in the sealed can barrel 132, if any. The control device 160 can be configured to send an alert through the interface when the detected number of sealed cans is below a threshold, such as 0 sealed cans remaining, 1 sealed can remaining, 2 sealed cans remaining, etc. The control device 160 can check every time a can is dispensed from the sealed can barrel 132 so that the current number of sealed cans in the sealed can barrel 132 can be known to the user.

All such weight sensing signals can be stored by the control device and then later transmitted, through the network interface for storage in another location such as but not limited to the cloud or a local or external database.

The control device 160 can also receive rotational data from each of the elevation motor 187 and the rotation motor 181. To determine the vertical height and the rotational orientation of the support arm 180.

The control device 160 also transmits rotational data to each of the elevation motor 187 and the rotation motor 181, causing these motors to move the support arm according to stored rules.

In one example, the control device 160 can be configured to operate support arm 180, and optionally opening cover 202, as discussed above, to expose the contents of an opened can through the feeding opening 200 for a period of time once motion is detected by a proximity sensor or by the camera of the control device 160. The camera may be used as a proximity sensor or for recognition of different pets. The proximity sensor may also be a receiver of a signal from a device on an animal, such as an RFID chip on a collar of an animal or a microchip within the animal.

In another example embodiment, the control device 160 can be configured to run a machine learning model using images received from a camera (the camera of the control device 160). The machine learning model can be stored in the memory of the control device 160, and can be a classification model that can distinguish different animals accessing the feeding system 100. In another embodiment, the process of recognition can be transmitted from the control device 160 to a cloud network and/or external server for recognition processing and data obtained from this process can be stored on the cloud network and/or external server, and/or transmitted back to the control device 160.

The memory of the control device 160 can store a mapping of different animals to different course of actions to operate the feeding system 1. The control device 160 can run the machine learning model to identify an animal currently accessing the feeding system 1 (such as by physical size, shape, color and/or physical appearance, such as fur/eye color and/or fur pattern), and identify, in the memory, a course of actions mapped to the identified animal. For example, if an animal AA is mapped to an action of an allowed eating time of three minutes, in response to identifying animal AA, the control device 160 can operate support arm 180, and optionally opening cover 202, as discussed above, to expose the contents of an opened can through the feeding opening 200 for three minutes, The described embodiments and examples of the present disclosure are intended to be illustrative rather than restrictive, and are not intended to represent every embodiment or example of the present disclosure. While the fundamental novel features of the disclosure as applied to various specific embodiments thereof have been shown, described and pointed out, it will also be understood that various omissions, substitutions and changes in the form and details of the devices illustrated and in their operation, may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiment of the disclosure may be incorporated in any other disclosed or described or suggested form or embodiment as a general matter of design choice. Further, various modifications and variations can be made without departing from the spirit or scope of the disclosure as set forth in the following claims both literally and in equivalents recognized in law.

What is claimed is:

1. A feeding system comprising:
  a housing that substantially forms an exterior surface of the feeding system, inside the housing comprising:
    an arm configured to rotate clockwise and counterclockwise to a plurality of positions, wherein the arm is configured to support a can comprising food contents, wherein the plurality of positions comprise a can-opening position, a feeding position, a storage position, and a used-can removal position;

a first motor operatively connected to said arm for controlling said clockwise and counterclockwise rotation of said arm;

a second motor for controlling an elevation screw operating in conjunction with said arm to move the arm vertically upwards and downwards at each of the plurality of positions;

a programmed processor providing signals for controlling said first motor to move said arm and supported can to each of said plurality of positions and for controlling said second motor to move said arm and supported can vertically while at one of said plurality of positions;

a can opener to open the can at the can-opening position to provide an opened can;

an opening of the housing at the feeding position, wherein the food contents of the opened can are accessible at the feeding position for feeding from the opened can; and the storage position being away from the feeding position and away from the used-can removal position, wherein the opened can having unused food contents is temporarily stored at the storage position for a predetermined period of time, a capping arm at the storage position, the capping arm comprising a ring extending around the circumference of the capping arm, the ring contacting an exposed edge of the opened can to form a seal between the unused food contents and the environment around the feeding system;

wherein the programmed processor provides signals for controlling said first and second motors to configure rotational and vertical movement of said arm to move the can to the can-opening position and the feeding position; and wherein the arm moves the opened can having the unused food contents from the feeding position to the storage position, and subsequently from the storage position back to the feeding position after expiration of the predetermined period such that the unused food contents are again accessible at the feeding position.

2. The feeding system of claim 1, wherein the capping arm comprises one or more lights.

3. The feeding system of claim 2, wherein the one or more lights are configured to at least partially limit bacterial and/or mold growth on the unused food contents of the opened can.

4. The feeding system of claim 1, further comprising a can chute that is configured to be removable from the housing.

5. The feeding system of claim 4, wherein the can chute comprises a sealed can barrel and a used can barrel.

6. The feeding system of claim 5, wherein each of the sealed can barrel and the used can barrel are configured to maintain one or more cans.

7. The feeding system of claim 5, wherein the plurality of positions further comprise a sealed-can placement position, wherein an opening of the sealed can barrel is at the sealed-can placement position.

8. The feeding system of claim 7, wherein the opening of the sealed can barrel is configured to release a can from within the sealed can barrel onto a portion of the arm.

9. The feeding system of claim 5, wherein an opening of the used can barrel is at the used-can removal position.

10. The feeding system of claim 9, wherein the opening of the used can barrel is configured to receive a can from a portion of the arm into the used can barrel.

11. The feeding system of claim 1, further comprising a cover configured to move from a position that substantially covers the opening of the housing from an interior of the feeding system to a position that substantially exposes the opening of the housing to the interior of the feeding system.

12. The feeding system of claim 1, further comprising a control device, wherein the control device comprises one or more of a processor, a memory, a network interface, and an image sensor.

13. The feeding system of claim 1 wherein the arm comprises a proximal end and a distal end, wherein the proximal end is configured to pivot about a pivot point to move the distal end in a vertical direction which is substantially perpendicular to both the clockwise direction and the counterclockwise direction, wherein the distal end is configured to support the can.

14. The feeding system of claim 1 wherein the arm is attached to a carousel, the carousel configured to rotate the arm clockwise and counterclockwise to the plurality of positions.

15. The feeding system of claim 1 wherein the arm moves the opened can having the unused food contents from the feeding position to the storage position after a second predetermined period of time or after a set amount of the food contents has been eaten.

16. The feeding system of claim 1 wherein the can opener is configured to maintain the lid that is removed from the can after the can has been opened.

17. The feeding system of claim 1 wherein the ring is elastically deformable upon contact with an exposed edge of the opened can to form the seal between the unused food contents and the environment around the feeding system.

18. The feeding system of claim 1, wherein the predetermined period of time is determined based on an amount of unused food content or a signal provided by a sensor.

19. The feeding system of claim 1, further comprising:
a lid receptacle located beneath the can opener at the can-opening position for receiving a lid from the can, wherein the can opener separates a lid from the can and temporarily retains said separated lid, the lid receptacle configured to receive the separated lid from the can opener when the support arm moves said opened can to said feeding position.

20. A feeding system comprising:
a housing that substantially forms an exterior surface of the feeding system, inside the housing comprising:
an arm configured to rotate clockwise and counterclockwise to a plurality of positions, wherein the arm is configured to support a can comprising food contents, wherein the plurality of positions comprise a can-opening position, a feeding position, a storage position, and a used-can removal position;

a first motor operatively connected to said arm for controlling said clockwise and counterclockwise rotation of said arm;

a second motor for controlling an elevation screw operating in conjunction with said arm to move the arm vertically upwards and downwards at each of the plurality of positions;

a programmed processor providing signals for controlling said first motor to move said arm and supported can to each of said plurality of positions and for controlling said second motor to move said arm and supported can vertically while at one of said plurality of positions;

a can opener to open the can at the can-opening position to provide an opened can;

an opening of the housing at the feeding position, wherein the food contents of the opened can are accessible at the feeding position for feeding from the opened can; and the storage position being away from the feeding position and away from the used-can removal position, wherein the opened can having unused food contents is temporarily stored at the storage position for a predetermined period of time, and a capping arm at the storage position, the capping arm configured to one of: wholly cap the opened can by contacting the opened can having unused contents at the storage position or partially cap the opened can by positioning the capping arm over the opened can without touching the can;

wherein the programmed processor provides signals for controlling said first and second motors to configure rotational and vertical movement of said arm to move the can to the can-opening position and the feeding position; and wherein the arm moves the opened can having the unused food contents from the feeding position to the storage position, and subsequently from the storage position back to the feeding position after expiration of the predetermined period such that the unused food contents are again accessible at the feeding position.

21. The feeding system of claim 20, wherein the capping arm comprises one or more lights, the one or more lights are configured to at least partially limit bacterial and/or mold growth on the unused food contents of the opened can.

22. The feeding system of claim 20, further comprising a can chute that is configured to be removable from the housing, the can chute comprising a sealed can barrel and a used can barrel, each of the sealed can barrel and the used can barrel are configured to maintain one or more cans.

23. The feeding system of claim 22, wherein the plurality of positions further comprise a sealed-can placement position, wherein an opening of the sealed can barrel is at the sealed-can placement position.

24. The feeding system of claim 23, wherein the opening of the sealed can barrel is configured to release a can from within the sealed can barrel onto a portion of the arm.

25. The feeding system of claim 22, wherein an opening of the used can barrel is at the used-can removal position.

26. The feeding system of claim 25, wherein the opening of the used can barrel is configured to receive a can from a portion of the arm into the used can barrel.

27. The feeding system of claim 20, further comprising a cover configured to move from a position that substantially covers the opening of the housing from an interior of the feeding system to a position that substantially exposes the opening of the housing to the interior of the feeding system.

28. The feeding system of claim 20, further comprising a control device, wherein the control device comprises one or more of a processor, a memory, a network interface, and an image sensor.

29. The feeding system of claim 20 wherein the arm comprises a proximal end and a distal end, wherein the proximal end is configured to pivot about a pivot point to move the distal end in a vertical direction which is substantially perpendicular to both the clockwise direction and the counterclockwise direction, wherein the distal end is configured to support the can.

30. The feeding system of claim 20 wherein the arm is attached to a carousel, the carousel configured to rotate the arm clockwise and counterclockwise to the plurality of positions.

31. The feeding system of claim 20 wherein the arm moves the opened can having the unused food contents from the feeding position to the storage position after a second predetermined period of time or after a set amount of the food contents has been eaten.

32. The feeding system of claim 20 further comprising:
a lid receptacle located beneath the can opener at the can-opening position for receiving a lid from the can, wherein the can opener separates a lid from the can and temporarily retains said separated lid, the lid receptacle configured to receive the separated lid from the can opener when the support arm moves said opened can to said feeding position.

33. The feeding system of claim 20 wherein the capping arm comprises a ring extending around the circumference of the capping arm, wherein the ring is elastically deformable upon contact with an exposed edge of the opened can to form a seal between the unused food contents and the environment around the feeding system.

34. The feeding system of claim 20, wherein the predetermined period of time is determined based on an amount of unused food content or a signal provided by a sensor.

* * * * *